US012164704B2

(12) United States Patent
Na et al.

(10) Patent No.: US 12,164,704 B2
(45) Date of Patent: Dec. 10, 2024

(54) DISPLAY APPARATUS

(71) Applicant: Artilux, Inc., Menlo Park, CA (US)

(72) Inventors: Yun-Chung Na, San Jose, CA (US);
Shu-Lu Chen, Zhubei (TW)

(73) Assignee: Artilux, Inc., Menlo Park, CA (US)

( * ) Notice: Subject to any disclaimer, the term of this patent is extended or adjusted under 35 U.S.C. 154(b) by 0 days.

(21) Appl. No.: 18/138,286

(22) Filed: Apr. 24, 2023

(65) Prior Publication Data

US 2023/0341951 A1    Oct. 26, 2023

Related U.S. Application Data

(63) Continuation of application No. 17/849,888, filed on Jun. 27, 2022, now Pat. No. 11,669,172, which is a
(Continued)

(51) Int. Cl.
*G06F 3/03*        (2006.01)
*G02F 1/1333*      (2006.01)

(52) U.S. Cl.
CPC ........ *G06F 3/0325* (2013.01); *G02F 1/13338* (2013.01)

(58) Field of Classification Search
CPC .... G06F 3/0325; G06F 3/0418; G06F 3/0421; G02F 1/13338; G02F 1/13312
See application file for complete search history.

(56) References Cited

U.S. PATENT DOCUMENTS 7,629,661 B2    12/2009  Rafferty et al.
7,884,310 B2     2/2011  Buettgen
(Continued)

FOREIGN PATENT DOCUMENTS

EP    2224319      9/2010
TW    200931128    7/2009
(Continued)

OTHER PUBLICATIONS

Bamji et al., "A 0.13 μm CMOS System-on-Chip for a 512 × 424 Time-of-Flight Image Sensor With Multi-Frequency Photo-Demodulation up to 130 MHz and 2 GS/s ADC," IEEE J. Solid-State Circuits, Jan. 2015, 50(1):303-319.
(Continued)

*Primary Examiner* — Sahlu Okebato
(74) *Attorney, Agent, or Firm* — Fish & Richardson P.C.

(57) ABSTRACT

Methods and devices for a display apparatus. In one aspect, a display apparatus includes a display device including a transparent layer, a display integrated circuit layer including one or more display control circuits, and a shielding layer between the transparent layer and the display integrated circuit layer, a near-infrared (NIR) light source and a visible light source, and a detector device including a detector integrated circuit layer including one or more detector control circuits, where a surface of the detector device contacts a surface of the display device, and a photodetector electrically coupled to at least one detector control circuit and including a detection region positioned to receive NIR light propagating from a front side of the display device to a back side of the display device along a path, where the shielding layer includes a filter region positioned in the path.

18 Claims, 15 Drawing Sheets

Related U.S. Application Data continuation of application No. 17/447,966, filed on Sep. 17, 2021, now Pat. No. 11,372,483, which is a continuation of application No. 17/210,195, filed on Mar. 23, 2021, now Pat. No. 11,126,274, which is a continuation of application No. 16/405,573, filed on May 7, 2019, now Pat. No. 10,969,877.

(60) Provisional application No. 62/668,261, filed on May 8, 2018.

(56) References Cited

U.S. PATENT DOCUMENTS

| | | | |
|---|---|---|---|
| 8,405,823 | B2 | 3/2013 | Pfaff |
| 10,146,376 | B2* | 12/2018 | Wassvik .................. H01S 5/423 |
| 10,969,877 | B2 | 4/2021 | Na et al. |
| 11,126,274 | B2 | 9/2021 | Na et al. |
| 11,372,483 | B2 | 6/2022 | Na et al. |
| 11,669,172 | B2 | 6/2023 | Na et al. |
| 2002/0067341 | A1 | 6/2002 | Kobayashi |
| 2004/0124765 | A1 | 7/2004 | Iwase |
| 2009/0058824 | A1 | 3/2009 | Nissar et al. |
| 2009/0231511 | A1* | 9/2009 | Takahashi ............... G06F 3/042 |
| | | | 349/61 |
| 2009/0295744 | A1 | 12/2009 | Onishi |
| 2010/0220077 | A1 | 9/2010 | Fukunaga et al. |
| 2011/0096032 | A1 | 4/2011 | Nakanishi |
| 2012/0241769 | A1 | 9/2012 | Katoh |
| 2012/0287085 | A1 | 11/2012 | Yuki et al. |
| 2014/0159129 | A1 | 6/2014 | Wang |
| 2015/0331508 | A1 | 9/2015 | Nho et al. |
| 2016/0155883 | A1 | 6/2016 | Shi et al. |
| 2017/0060296 | A1* | 3/2017 | Wang ....................... G06F 3/041 |
| 2017/0078513 | A1* | 3/2017 | Chang ............... H01L 27/14612 |
| 2018/0233521 | A1 | 8/2018 | Na et al. |
| 2018/0247968 | A1 | 8/2018 | Na et al. |
| 2018/0260602 | A1 | 9/2018 | He et al. |
| 2019/0346939 | A1 | 11/2019 | Na et al. |
| 2021/0232236 | A1 | 7/2021 | Na et al. |
| 2022/0004267 | A1 | 1/2022 | Na et al. |
| 2022/0334654 | A1 | 10/2022 | Na et al. |

FOREIGN PATENT DOCUMENTS

| | | |
|---|---|---|
| TW | 201207814 | 2/2012 |
| TW | 201810647 | 3/2018 |

OTHER PUBLICATIONS

Bianco et al., "A Comparative Analysis between Active and Passive Techniques for Underwater 3D Reconstruction of Close-Range Objects," Sensors, Aug. 20, 2013, 13(8):11007-11031.
Chen et al., "Self-Aligned Microbonded Germanium Metal-Semiconductor-Metal Photodetectors Butt-Coupled to Si Waveguides," IEEE J. Sel. Top. Quant. Electron., Nov. 2014, 20(6):3800605, 5 pages.
Dalla Betta et al., "Design and Characterization of Current-Assisted Photonic Demodulators in 0.18-µm CMOS Technology," IEEE Trans. Electron. Dev., Jun. 2011, 58(6):1702-1709.
Extended European Search Report in European Application No. 19196783.5-1212, dated Mar. 9, 2020, 9 pages.
Feng et al., "Vertical p-i-n germanium photodetector with high external responsivity integrated with large core Si waveguides," Optics Express, Jan. 4, 2010, 18(1):96-101.
Foix et al., "Lock-in Time-of-Flight (ToF) Cameras: A Survey," IEEE Sensors J., Sep. 2011, 11(9):1917-1926.
Geng, "Structured-light 3D surface imaging: a tutorial," Advances in Optics and Photonics, Jun. 30, 2011, 3(2):128-160.
Hutchinson et al., "High-Resolution Aliasing-Free Optical Beam Steering," Optica, Aug. 5, 2016, vol. 3, No. 8, 4 pages.
Joo et al., "High-sensitivity 10 Gbps Ge-on-Si photoreceiver operating at λ ~1.55 µm," Optics Express, Aug. 2, 2010, 18(16):16474-16479.
Kato et al., "320 × 240 Back-Illuminated 10-µm CAPD Pixels for High-Speed Modulation Time-of-Flight CMOS Image Sensor," IEEE J. Solid-State Circuits, Apr. 2018, 53(4):1071-1078.
Kawahito et al., "A CMOS Time-of-Flight Range Image Sensor With Gates-on-Field-Oxide Structure," IEEE Sensors J., Dec. 2007, 7(12):1578-1586.
Kim et al., "A Three-Dimensional Time-of-Flight CMOS Image Sensor With Pinned-Photodiode Pixel Structure," IEEE Electron. Dev. Lett., Nov. 2010, 31(11):1272-1274.
Koester et al., "Ge-on-SOI-Detector/Si-CMOS-Amplifier Receivers for High-Performance Optical-Communication Applications," J. Lightw. Technol., Jan. 2001, 25(1):46-57.
Lange et al., "Solid-State Time-of-Flight Range Camera," IEEE J. Quant. Electron., Mar. 2001, 37(3):390-397.
Li et al., "High-Bandwidth and High-Responsivity Top-Illuminated Germanium Photodiodes for Optical Interconnection," IEEE Trans. Electron Dev., Mar. 2013, 60(3):1183-1187.
Lischke et al., "High bandwidth, high responsivity waveguide-coupled germanium p-i-n photodiode," Optics Express, Oct. 19, 2015, 23(21):27213-27220.
Liu et al., "Backside-incidence critically coupled Ge on SOI photodetector," Proc. SPIE 10100, Optical Components and Materials, Feb. 16, 2017, XIV, 101001X, 6 pages.
Michel et al., "High-performance Ge-on-Si photodetectors," Nature Photon., Jul. 30, 2010, 4:527-534.
Morse et al., "Performance of Ge-on-Si p-i-n Photodetectors for Standard Receiver Modules," IEEE Photon. Technol. Lett., Dec. 1, 2006, 18(23):2442-2444.
Office Action in Taiwanese Appln. No. 108115848, dated Jul. 6, 2022, 16 pages (with English Translation).
Perenzoni et al., "Compact SPAD-Based Pixel Architectures for Time-Resolved Image Sensors," Sensors, May 23, 2016, 16(5):745, 12 pages.
Rafferty et a., "Monolithic germanium SWIR imaging array," 2008 IEEE Conference on Technologies for Homeland Security, Waltham, MA, May 12, 2008, p. 577-582.
Ringbeck et al., "Multidimensional measurement by using 3-D PMD sensors," Adv. Radio Sci., Jan. 1, 2007, 5:135-146.
Tseng et al., "High-performance silicon-on-insulator grating coupler with completely vertical emission," Optics Express, Sep. 21, 2015, 23(19):24433-9.
Tseng et al., "A self-assembled microbonded germanium/silicon heterojunction photodiode for 25 GB/s high-speed optical interconnects," Sci. Rep., Nov. 15, 2013, 3:3225, 6 pages.
Van Der Tempel et al., "Lock-in Pixel Using a Current-Assisted Photonic Demodulator Implemented in 0.6 µm Standard Complementary Metal-Oxide-Semiconductor," Jpn. J. Appl. Phys., Apr. 24, 2017, 46(4B):2377-2380.
Van Nieuwenhove et al., "Photonic Demodulator With Sensitivity Control," IEEE Sensors J., Mar. 2007, 7(3):317-318.
Wu et al., "A critically coupled Germanium photodetector under vertical illumination," Opt. Express, Dec. 31, 2012, 20(28):29338-29346.
Yin et al., "31GHz Ge n-i-p waveguide photodetectors on Silicon-on-Insulator substrate," Optics Express, Oct. 17, 2007, 15(21):13965-13971.
Yokogawa et al., "IR sensitivity enhancement of CMOS Image Sensor with diffractive light trapping pixels," Sci. Rep., Jun. 19, 2017, 7(1):3832, 9 pages.
Yun-Chung Na, U.S. Appl. No. 18/138,286, filed Apr. 24, 2023, Display Apparatus.

* cited by examiner

DISPLAY APPARATUS

CROSS-REFERENCE TO RELATED APPLICATIONS

This application is a continuation of U.S. patent application Ser. No. 17/849,888, entitled "Display Apparatus," filed Jun. 27, 2022, which is a continuation of U.S. patent application Ser. No. 17/447,966, entitled "Display Apparatus," filed Sep. 17, 2021, now U.S. Pat. No. 11,372,483, which is a continuation of U.S. patent application Ser. No. 17/210,195, entitled "Display Apparatus," filed Mar. 23, 2021, now U.S. Pat. No. 11,126,274, which is a continuation of U.S. patent application Ser. No. 16/405,573, entitled "Display Apparatus," filed May 7, 2019, now U.S. Pat. No. 10,969,877, which claims the benefit under 35 U.S.C. § 119(e) of U.S. Patent Application No. 62/668,261, entitled "Simultaneous Optical Emission and Detection Display," filed May 8, 2018, which are incorporated herein by reference in their entirety.

BACKGROUND

Optical displays can include sensing components to facilitate interactive features (e.g., touch, swipe, gestures, fingerprint readers, etc.) for users of the optical displays to interact with the optical displays while viewing visual content on the optical displays.

SUMMARY

This specification describes technologies relating to display apparatus configured for simultaneous optical emission and detection of objects.

In general, one innovative aspect of the subject matter described in this specification can be embodied in a display apparatus including a display device having a front side and a back side opposite the front side and including a transparent layer, a display integrated circuit layer including one or more display control circuit and a shielding layer located between the transparent layer and the display integrated circuit layer, and a near-infrared (NIR) light source that is configured to direct NIR light to the transparent layer and a visible light source that is configured to direct visible light to the transparent layer. The display apparatus further includes a detector device located at the back side of the display device and including a detector integrated circuit layer including one or more detector control circuits, where a surface of the detector device contacts a surface of the display device, and a photodetector electrically coupled to at least one detector control circuit and including a detection region, the detection region being positioned to receive NIR light propagating from the front side of the display device to the back side of the display device along a path, and where the shielding layer includes a filter region positioned in the path. Other embodiments of this aspect include corresponding systems, apparatus, and computer programs, configured to perform the actions of the methods, encoded on computer storage devices.

These and other embodiments can each optionally include one or more of the following features. In some implementations, the photodetector includes germanium (Ge) or germanium-silicon (GeSi) material.

In some implementations, the NIR light source is electrically coupled to at least one display control circuit of the one or more display control circuits, and/or is electrically coupled to at least one detector control circuit of the one or more detector control circuits. The NIR light source can be integrated with the display device and/or be integrated with the detector. The one or more display control circuits and the one or more detector control circuits can include thin-film transistors (TFTs), complementary metal-oxide semiconductor (CMOS) transistors, or a combination thereof.

In some implementations, the display device can include a liquid crystal layer below the transparent layer.

In some implementations, the display apparatus further includes a growth (e.g., monolithically integrated) or a bonding (e.g., mechanical bonding) interface between the display device and the detector device.

In some implementations the visible light source includes an array of visible organic light-emitting diodes, visible micro-light emitting diodes, or a combination thereof. The NIR light source can include an array of NIR organic light-emitting diodes, NIR micro-light emitting diodes, or a combination thereof.

In general, another aspect of the subject matter described in this specification can be embodied in a display apparatus including a display device having a front side and a back side opposite the front side and including a transparent layer, a shielding layer arranged between the transparent layer and the back side of the display device, the shielding layer including a filter region, a NIR light source configured to direct NIR light to the transparent layer, and a detector device including a detector integrated circuit layer including one or more detector control circuits, and a photodetector electrically coupled to at least one detector control circuit of the one or more detector control circuits.

These and other embodiments can each optionally include one or more of the following features. In some implementations, the display device further includes a display integrated circuit layer including one or more display control circuits.

The detection region of the photodetector can be aligned with the filter region in a vertical direction. In some implementations, the display device further includes a visible light source electrically coupled to at least one display control circuit of the one or more display control circuits, where the visible light source is configured to direct visible light to the transparent layer. In some implementations, the NIR light directed by NIR light source to the transparent layer is not overlapped with visible light directed by the visible light source to the transparent layer within the transparent layer.

In some implementations, the display apparatus can further include a backlight module under the display device, where the display device further includes a liquid crystal layer below the transparent layer. The detector device can be located between the display device and the backlight module.

Particular embodiments of the subject matter described in this specification can be implemented so as to realize one or more of the following advantages. An advantage of this technology is that the display apparatus can simultaneously emit light and monitor reflected light from an object (e.g., a user's fingers). The detector can be used to monitor various properties of the reflected light (e.g., polarization, intensity, phase, etc.) and then infer the properties of the object through techniques such as amplitude image detection and/or depth image detection, for example, using time-of-flight measurements. By detecting reflected wavelengths of near-infrared (NIR) light that are longer, e.g., >1 micron, the described technology can reduce interference at the detector caused by visible light emitted by the display and from the ambient, improve device performance by shielding the integrated circuit layers (e.g., including thin-film transistors, i.e., TFTs on amorphous, polycrystalline, or other type of silicon) from the visible light, and improve bio-layer penetration and sensing by pushing to longer NIR wavelengths.

In some implementations, a display apparatus can be configured to have control circuits that are TFTs, which have lower processing temperature relative to traditional CMOS devices, making achieving a lower thermal budget (e.g., staying below thermal budget of Ge detector) easier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1A:
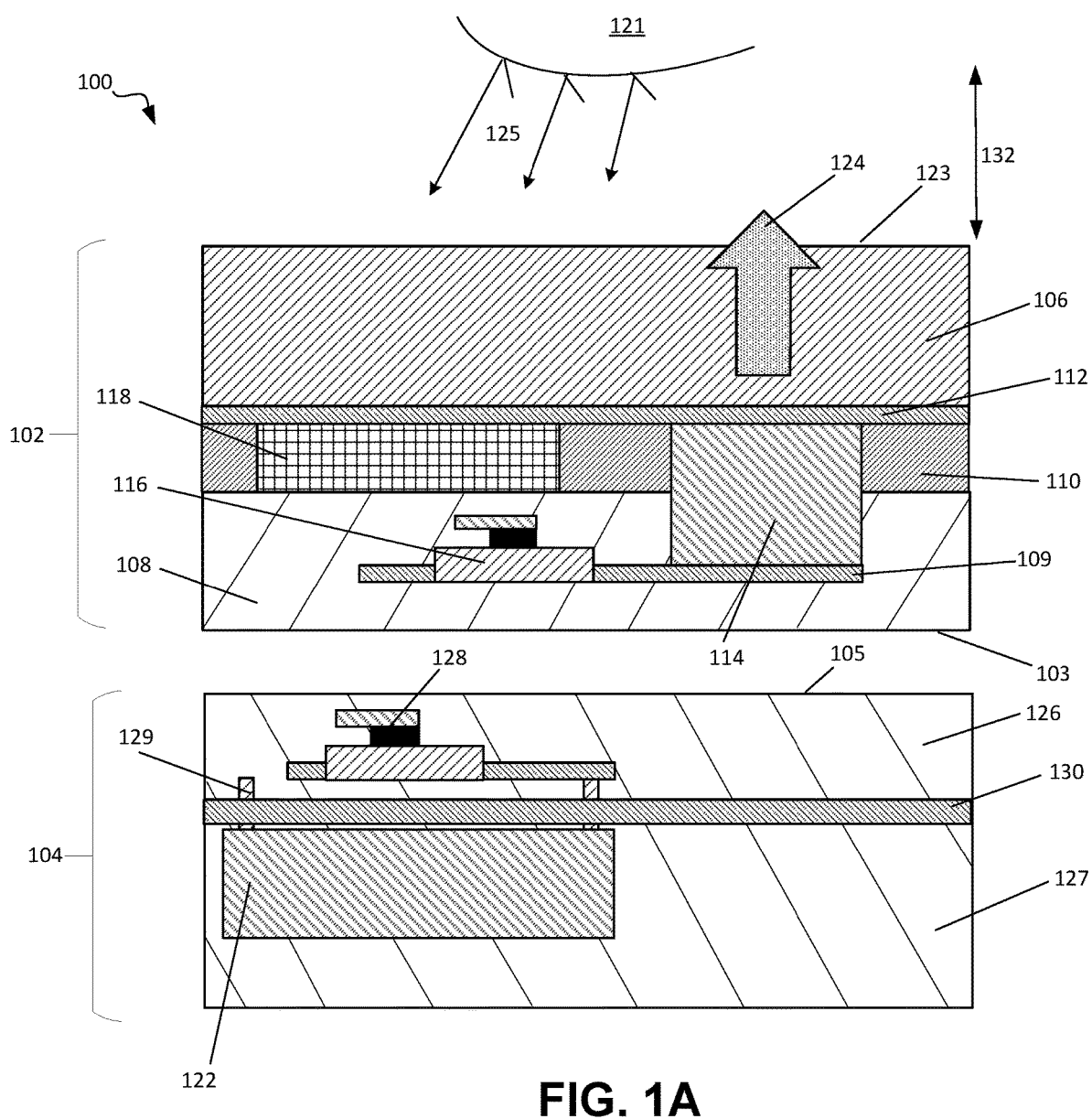
FIGS. 1A through 1E are cross-sectional schematics of example display apparatuses.

This specification describes technologies related to a display apparatus that can simultaneously emit light and detect the proximity of objects (e.g., a user finger, hand, or face near the display). The technology utilizes a GeSi or Ge detector to detect near-infrared (NIR) light that is reflected off objects that are in close proximity to the display apparatus to determine an amplitude image and/or a depth image of the objects relative to the display apparatus.

More particularly, the technology incorporates a display device, a detector device, a red-green-blue (RGB) light source, and a near-infrared (NIR) light source. A bottom surface of the display device is in contact with a top surface of the detector device by, e.g., monolithic growth, mechanical bonding, or other similar methods.

The NIR light source is configured to emit NIR light that is arranged to be incident substantially normal to a surface of the display device. In some embodiments, the NIR light source is integrated with the display device or the detector device. In some embodiments, the NIR light has a peak wavelength not less than 1000 nm (e.g., 1.55 microns or 1.31 microns or 1.064 microns). In some embodiments, the NIR light has a peak wavelength not greater than 2000 nm. The NIR light source can be, for example, an organic light-emitting diode (OLED), a micro light-emitting diode (Micro-LED), an LED, a vertical cavity surface emitting laser (VCSEL), an edge emission laser (EEL) such as distributed-feedback (DFB) laser or distributed-Bragg reflector (DBR) laser, and laser diode, etc., and is arranged in an array format every one or few pixels of the display device.

The display device includes i) a transparent layer (e.g., a protective glass) ii) a first electrode area (e.g., transparent conductive oxide layer, metal layer) iii) a second electrode area (e.g., transparent conductive oxide layer, metal layer) iv) display integrated circuits (IC) layer including a multiple display control circuits (e.g., CMOS transistors, TFTs, other control devices) and v) a shielding layer to prevent visible light from reaching the IC layer (e.g., to prevent visible light from the ambient, reflective visible light from the display, etc. from reaching the IC layer). In some implementations, the shielding layer can include a first filter region for allowing a NIR light having a peak wavelength no less than 1000 nm passing through. The first filter region is overlapped with the detector device but not overlapped with the NIR light source in a vertical direction. The first filter region may function as an optical interference filter. The shielding layer and the NIR light source may be between the display integrated circuits layer and the transparent layer.

In some embodiments, the NIR light source is between the first electrode area and the second electrode area. The NIR light source is electrically coupled to at least one display control circuit of the multiple display control circuits via the second electrode area.

The red-green-blue (RGB) light source is configured to emit RGB light having peak wavelengths different from the peak wavelength of the NIR light emitted from the NIR light source. The RGB light source (e.g., OLED, Micro LED, LED, etc.) is arranged in an array format every one or few pixels. The NIR light source is not overlapped with the RGB light source in a vertical direction, where emission of both the NIR light source and the RGB light source are aligned in the vertical direction. In some embodiments, the shielding layer can include a second filter region for allowing the NIR light source having a peak wavelength no less than 1000 nm passing through (e.g., 1.064 microns, 1.31 microns, 1.55 microns, or the like). The first filter region is separated from the second filter region from a cross sectional of view of the display apparatus.

The detector device includes i) a detecting integrated circuit (IC) layer including multiple detector control circuits (e.g., complementary metal-oxide semiconductor (CMOS) transistors, thin-film transistors (TFTs), or other control devices) and ii) a detector (e.g., a SiGe detector, Ge-on-Si detector, etc.), where the detector is located directly underneath the first filter region. The detector is in electrical contact with at least one detector control circuit from the detecting IC layer.

In some embodiments, the detector device performs time-of-flight measurements of the reflected NIR light originating from the NIR light source(s). In some embodiments, the detecting IC layer is supported by a carrier substrate. The detector is supported by a donor substrate. A bonding layer exists in between the detector and the detecting IC layer for establishing electrical connection.

In some embodiments, the display apparatus includes a liquid crystal display (LCD). The display device can include a liquid crystal layer between a first electrode area and a second electrode area. The display apparatus can further include a backlight module positioned under the display device, and a first and a second polarizer film sandwiching the liquid crystal layer. A color filter can be located between the first polarizer and the second polarizer. A detector device can be located between the backlight module and the display device.

Example Display Apparatus

FIG. 1A is a cross-sectional schematic of an example display apparatus 100. Display apparatus 100 includes a display device 102 and a detector device 104. Display device 102 and detector device 104 can be aligned using, for example, wafer/die bonding, chip stacking, or another similar method, where a first surface 103 of the display device 102 is in contact with a second surface 105 of the detector device 104.

Display device 102 includes a transparent layer 106, a display integrated circuit layer 108, a shielding layer 110, and a first electrode area (e.g., a transparent conductive oxide layer) 112. Additionally, the display device 102 includes a light source 114, where the light source 114 is in electrical and physical contact with at least one display control circuit 116 in the display integrated circuit layer 108.

Transparent layer 106 is a packaging layer, e.g., a glass layer, plastic layer, or composite layer, with transparency above at least 50% over a broadband spectrum, e.g., visible and near-infrared wavelengths. In one example, the transparent layer 106 has a 90% transmission rate for a broadband spectrum ranging from 380 nm to 1.55 microns. Transparent layer 106 can act as a physical barrier to protect the other layers of the display device 102 from ambient conditions (e.g., waterproof, UV protection, shatter-resistance, scratch-resistant, etc.).

The display integrated circuit layer 108 is an amorphous silicon (a-Si), a polycrystalline silicon (p-Si), or other types of silicon layers and include multiple display control circuits 116. The display control circuits 116 can include, for example, a thin-film transistor (TFT) device, where the multiple display control circuits 116 can be fabricated in a multi-layer structure within the silicon layer of the display integrated circuit layer 108. The TFT devices can be, for example, staggered or coplanar construction, and can be fabricated using CMOS fabrication techniques. Fabrication details of the display integrated circuit layer 108 are discussed in further detail below.

In some implementations, the display device 102 further includes a second electrode area 109, e.g., a second transparent conductive oxide layer or metal/metallic layer, in the display integrated circuit layer 108. The second electrode area 109 is in electrical and physical contact with the light source 114, where the NIR light source 114 is located between and in electrical contact with the first electrode area 112 and the second electrode area 109.

In some implementations, the display integrated circuit layer 108 is a part of an active-matrix organic light-emitting diode (AMOLED) display screen where the display integrated circuit layer 108 includes a display control circuit 116 (e.g., a circuit including TFT devices) for each pixel on the AMOLED display screen.

In some implementations, the display integrated circuit layer 108 is a part of a thin-film transistor liquid crystal display (TFT LCD), where each of the multiple display control circuits 116 are embedded within the TFT LCD panel. LCD type display apparatuses are discussed in further detail below, with reference to FIGS. 5A and 5B.

Shielding layer 110 is located between the display integrated circuit layer 108 and the first electrode area 112. Shielding layer 110 is composed in part of a filtering material, e.g., a polymer or other material absorbing visible wavelengths to prevent visible wavelengths from reaching particular layers of the display device 102 and detector device 104, e.g., the display integrated circuit layer 108 and the layers of the detector device 104. The shielding layer 110 can be composed in part of polymer materials such as colored polyethylene or polypropylene or the like.

The shielding layer 110 includes a first filter region 118. The first filter region 118 is overlapped with a detector 122 of the detector device 104 but not overlapped with the light source 114 in a vertical direction substantially normal to a front surface 123 of the display device 102. The first filter region 118 of the shielding layer 110 can be configured to be an optical filter that reflects one or more spectral bands or lines and transmits others, while maintaining a nearly zero coefficient of absorption for all wavelengths of interest, e.g., the near-infrared wavelength spectrum. The optical filter of the first filter region 118 can be, for example, an interference filter (e.g., a high-pass filter, a low-pass filter, a band-pass filter, a band-rejection filter, or a dichroic filter). The first filter region 118 is configured to allow near-infrared light, e.g., NIR light 125 reflected from an object 121, to penetrate through the front surface 123 of the display device 102 and reach the detector 122 of the detector device 104. The first filter region 118 can include, for example, different dielectric material with different refractive index. The first filter region 118 can be an area of the shielding layer 110 in a direction perpendicular to the front surface 123 that ranges between a few microns to hundreds of microns, and that is at least a threshold area to allow for reflected NIR light 125 from the light source 114 to reach the detector 122.

The first electrode area 112 is located between the transparent layer 106 and the shielding layer 110. The first electrode area 112 includes one or more thin films of optically transparent (e.g., in the visible and near-infrared spectrums) and electrically conductive material. The first electrode area 112 can include transparent conductive oxide material (for example, indium tin oxide (ITO)), conductive polymers, metal or metallic grids or networks, carbon nanotubes, or other similar materials.

Light source 114 is electrical coupled to at least one display control circuit 116 of the multiple display control circuits of the display integrated circuit layer 108. In some implementations, the light source 114 is located between the first electrode area 112 and the second electrode area 109, and is electrically coupled to at least one display control circuit 116 of the multiple display control circuits via the second electrode area 109.

Though depicted in FIG. 1A as one light source 114, light source 114 is one of multiple light sources 114, where the multiple light sources 114 are included in an array of light sources. In some implementations, the array of light sources consists of sub-array units, where each sub-array unit includes multiple light sources 114, for example, an red-green-blue (RGB) light source (e.g., a red light source, a blue light source, a green light source, or a light source capable of emitting red, green and blue light simultaneously), and a near-infrared (NIR) light source. The RGB light source is configured to emit RGB light having peak wavelengths different from the peak wavelength of the NIR light emitted from the NIR light source. The RGB light source (e.g., an organic light-emitting diode (OLED), Micro light emitting diode (LED), LED, etc.) is arranged in an array format every one or few pixels.

The NIR light source is not overlapped with the RGB light source in a vertical direction, where emissions of both the NIR light source and the RGB light source are aligned in the vertical direction. The NIR light source 114 is a light source, for example, an organic light-emitting diode (OLED), Micro light emitting diode (LED), LED, a vertical cavity surface emitting laser (VCSEL), an edge emission laser (EEL) such as distributed-feedback (DFB) laser or distributed-Bragg (DBR) laser, and laser diode etc., that emit a range of wavelengths between, ~700 nm to ~1.65 microns.

Light source 114 can be fabricated with the display device 102, for example, during the fabrication process of forming the display integrated circuit layer 108. Other methods for configuring the light source 114 with respect to the display device 102 and/or the detector device 104 are discussed below with reference to FIGS. 1B through 1E.

The detector device 104 includes one or more detectors 122 and a detector integrated circuit layer 126, supported by a substrate 127 (e.g., a silicon substrate). The detector integrated circuit layer 126 includes multiple detector control circuits 128, where each detector 122 of the one or more detectors 122 is in electrical contact, e.g., via interconnect 129, with at least one of the multiple detector control circuits 128. The multiple detector control circuits 128 can be, for example, a complementary metal-oxide semiconductor (CMOS) device, a TFT device, or a combination thereof. The multiple detector control circuits 128 can be arranged in a multi-layer (e.g., two or more interconnected layers) array within the detector integrated circuit layer 126.

A type of detector control circuit 128 utilized for a particular detector integrated circuit layer 126 can be selected in part based on a material of the detector integrated circuit layer 126. In one example, a material of the detector integrated circuit layer 126 is crystalline silicon and the detector control circuit 128 is a CMOS device-based circuit. In another example, the material of the detector integrated circuit layer 126 is a-Si/p-Si/other types of silicon and the detector control circuit 128 is a TFT device-based circuit. Further discussion of a detector integrated circuit layer 126 including a-Si/p-Si/other types of silicon is discussed below with reference to FIGS. 2A through 2E.

Each detector 122 of the one or more detectors 122 is electrically connected to at least one detector control circuit 128 which can be configured to operate the detector 122, e.g., to apply a bias to the detector 122, receive electrical signal that is a measure of an optical signal absorbed within the detector 122, etc. The detectors 122 can be arranged in an array, where each of the detectors 122 of the array of multiple detectors, is aligned within the first filter region 118 of the display device 102 when the display device 102 and the detector device 104 are aligned and bonded together at the respective first surface 103 and second surface 105.

Detector 122 can be, for example, a germanium (Ge) detector, or a silicon-germanium (SiGe) detector. In general, the detector 122 can have a detection region having a range thicknesses of 0.5 micron to 5 microns, where a thickness of the detection region of the detector 122 is selected in part to facilitate the absorption of reflected NIR light 125 within the detection region of the detector 122. The detector 122 converts the absorbed reflected NIR light 125 into electrical signal, which can be collected by the one or more electrically connected detector control circuits 128 of the detector integrated circuit layer 126. In some implementations, a detector 122 can be a photodetector, e.g., a single-output photodetector or a dual-output photodetector for performing time-of-flight measurements, which is discussed in further detail with reference to FIGS. 3 and 4.

In some implementations, the detector 122 and the detector integrated circuit layer 126 are each fabricated on respective substrates, e.g., crystalline silicon substrates. Each of the respective substrates can be processed using, for example, wafer-grinding and wafer polishing, to remove a portion or all of the respective substrates. The processed substrates can be bonded together such that the reflected NIR light 125 enters the detector 122 through the detector integrated circuit layer 126. The substrates can be bonded together using an interconnect circuit (IC) layer 130, including multiple interconnects 129, where the multiple interconnects 129 of the IC layer 130 electrically connect detectors 122 to detector control circuits 128. In some implementations, the detector and the detector integrated layer 126 are fabricated on the same substrates, e.g., crystalline silicon substrates.

When display device 102 and detector device 104 are aligned and bonded such that the first surface 103 and the second surface 105 of the respective devices are in contact, the detection region of the detector 122 is positioned to receive the reflected NIR light 125 propagating from the front side of the display device 102 to the back side of the display device 102, in which the first filter region 118 of the shielding layer 110 is positioned inbetween the NIR path. In other words, a location of the detector 122 is such that reflected NIR light 125 entering the transparent layer 106 can pass through the area defined by the first filter region 118 and be absorbed in the detection region of the detector 122.

In some implementations, the detector integrated circuit layer 126 is between the detector 122 and the display device 102 such that the reflected NIR light 125 enters the detector 122 through the detector integrated circuit layer 126. In some implementations, the detector 122 is between the detector integrated circuit layer 126 and the display device 102 such that the reflected NIR light 125 enters the detector 122 without passing through the detector integrated circuit layer 126. Materials of the intervening layers traveled by the reflected NIR light 125 between the transparent layer 106 and the detector 122 can be selected in part to reduce an amount of attenuation of the reflected NIR light 125 within the display apparatus 100. In some implementations, the materials of the intervening layers are selected such that an amount of attenuation of the reflected NIR light 125 is below a threshold attenuation amount.

In some implementations, one or more dimensions of the first filter region 118 can be selected to maximize an amount of reflected NIR light 125 reaching the detector 122 when the display device 102 and detector device 104 are aligned and bonded together. An amount of reflected NIR light 125 reaching the detector 122 can depend in part on an acceptance angle for the detector 122, in other words, the angle of incident reflected NIR light 125 on the front surface 123 of the transparent layer 106 that have line-of-sight of the detector 122 via the first filter region 118. A minimum range of acceptance angles can determine, for example, relative thicknesses of each intervening layer (e.g., of the shielding layer 110, display integrated circuit layer 108, and detector integrated layer 126).

In some implementations, reflected NIR light 125 is NIR light emitted by light source 114 that reflects off of an object 121 and is absorbed by a detection region of detector 122. Object 121 can be, for example, a finger, hand, or face. Reflected NIR light 125 from an object 121 located a distance 132 from front surface 123 can be collected based in part on a type of the object 121. For example, reflected NIR light 125 can be collected from an object 121 that is a finger at a distance 132 that is a few millimeters away (e.g., between 1 mm and 5 mm). In another example, reflected NIR light 125 can be collected from an object 121 that is a hand at a distance 132 that is a few to tens of centimeters away (e.g., between 2 cm and 50 cm, 15 cm, 30 cm, etc.). In another example, reflected NIR light 125 can be collected from an object 121 that is a face at a distance 132 that is tens to hundreds of centimeters away (e.g., between 10 cm and 200 cm, 80 cm, 150 cm, etc.).

Additional details of the operation of the display apparatus 100 is described below with reference to FIG. 6.

FIG. 1A depicts a display apparatus 100, according to some embodiments. FIGS. 1B through 1E depict the display apparatus 100, according to other embodiments.

Other Embodiments of the Display Apparatus

Figure 1B:
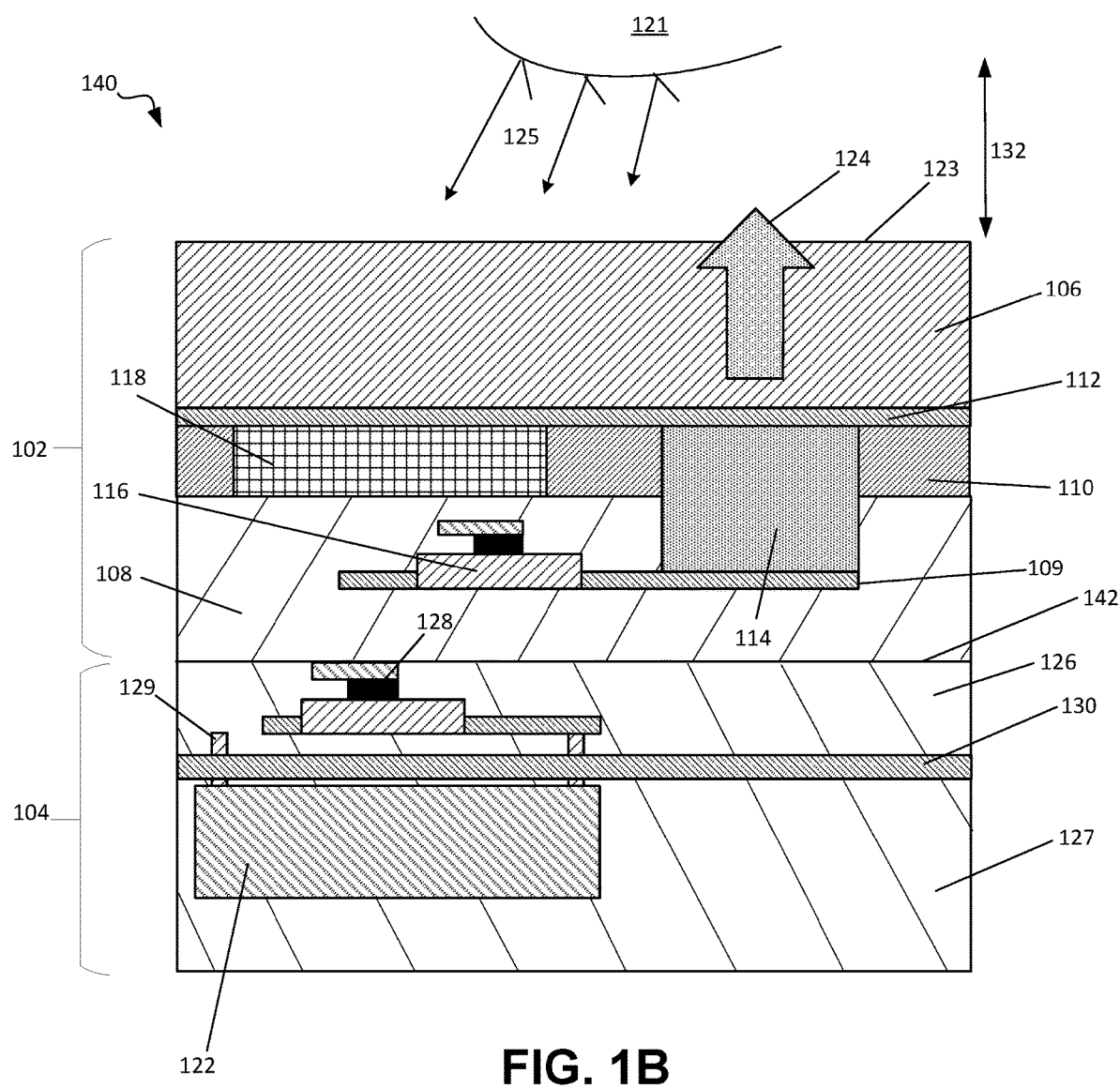

Though depicted in FIG. 1A as a display device 102 and a detector device 104 that are bonded together at first surface 103 and second surface 105, other configurations for the display apparatus 100 are possible. FIG. 1B is a cross-sectional schematic of another example display apparatus 140. The display apparatus 140 depicted in FIG. 1B is a monolithically integrated structure, that is, that the display device 102 and detector device 104 are fabricated using monolithic fabrication techniques, e.g., epitaxial and/or lateral growth techniques, that does not involve a mechanical bonding step to unify the display device 102 and the detector device 104 at the interface 142.

In some implementations, thermal budget constraints can determine fabrication processes available for fabricating the monolithically integrated structure of display apparatus 140. For example, detector 122 can be a Ge detector and has a thermal budget of 800° C., where any structures of the display apparatus 140 that are fabricated after the Ge detector 122 are restricted to not exceed 800° C.

In some implementations, the display apparatus 140 can be fabricated utilizing both a mechanical bonding technique and a monolithic integrated technique. For example, the display device 102 and the detector device 104 may each be monolithically integrated and then mechanically bonded together at interface 142, e.g., where the detector device 104 does not consist of two substrates bonded together with an IC layer 130 but is fabricated as a single device monolithically.

In some implementations, the detector integrated circuit layer 126 is between the detector 122 and the display device 102 such that the reflected NIR light 125 enters the detector 122 through the detector integrated circuit layer 126. In some implementations, the detector 122 is between the detector integrated circuit layer 126 and the display device 102 such that the reflected NIR light 125 enters the detector 122 without passing through the detector integrated circuit layer 126.

Figure 1C:
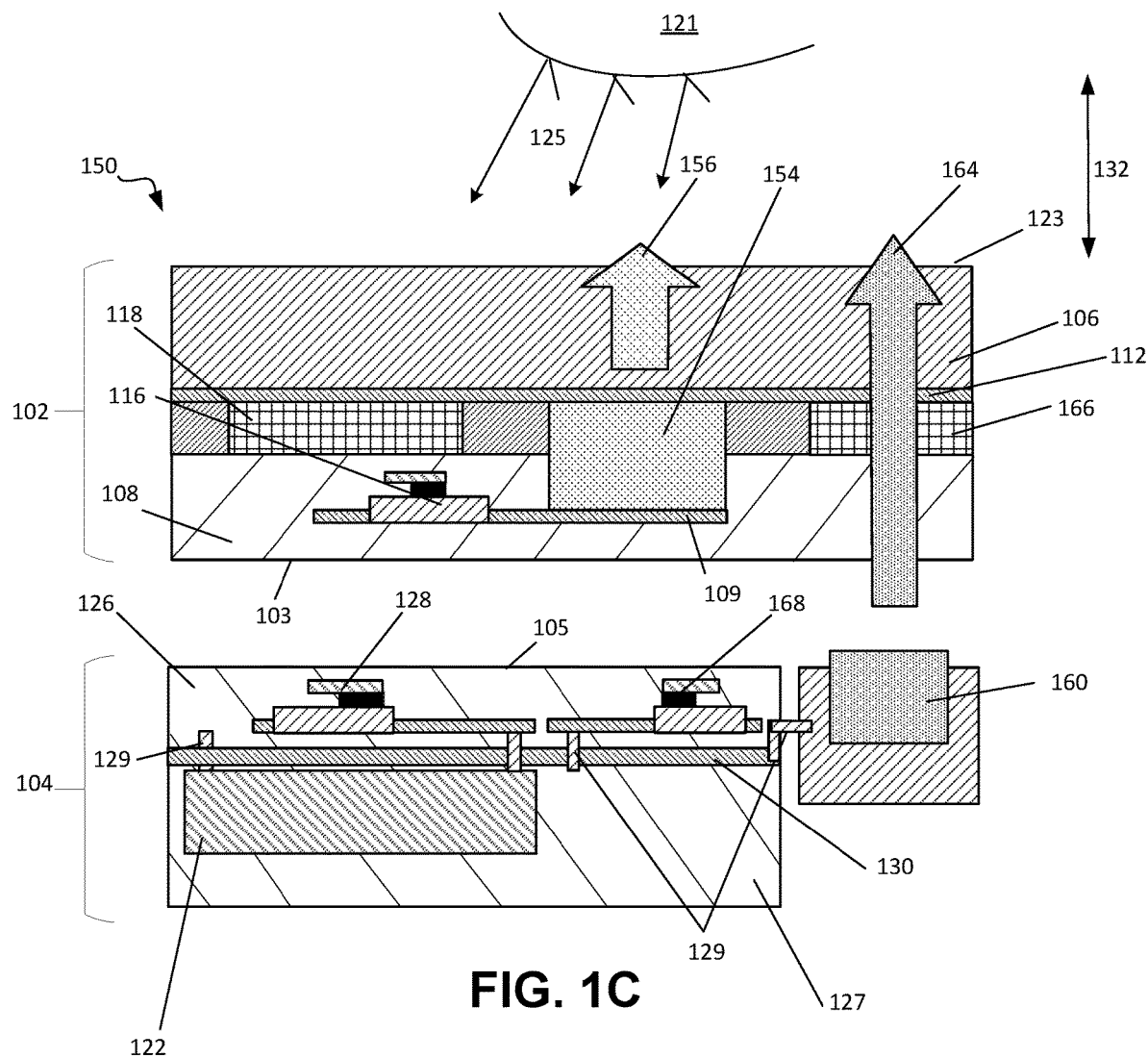

FIG. 1C is a cross-sectional schematic of another example display apparatus 150. Display apparatus 150 includes light sources 154 (e.g., RGB light sources 114) that are integrated into display device 102, where light sources 154 include an array of light sources 154 emitting visible light 156. In contrast to display apparatus 100 depicted in FIG. 1A, display apparatus 150 in FIG. 1C includes a light source 160 that is separated from the display device 102 and the detector device 104 and which is packaged beneath the display device 102 in contact with the first surface 103 of the display device 102. The light source 160 is a NIR light source, for example, a packaged laser diode, vertically-cavity surface emitting laser (VCSEL), an edge emission laser (EEL) such as distributed-feedback (DFB) laser or distributed-Bragg reflector (DBR) laser, an organic light-emitting diode (OLED), Micro light emitting diode (LED), LED or the like, that is separately fabricated, diced, and bonded or otherwise attached to a back side of the display device 102 in contact with the first surface 103. In one example, the light source 160 can be an InGaAs/InP VCSEL.

Light source 160 is positioned and bonded at the back side of the display device 102 such that the light source 160 emits NIR light 164 perpendicular to the front surface 123 of the transparent layer 106 of the display device 102. Display device 102 additionally can include a second filter region 166 which includes a same composition as first filter region 118. The second filter region 166 is embedded in the shielding layer 110 and aligned within the light source 160 such that the NIR light 164 emitted by the light source 160 passes through the second filter region 166 when the light source 160 is positioned and bonded at the back side of the display device 102.

In some implementations, the light source 160 is in electrical contact with IC layer 130 via one or more interconnects 129, where light source 160 can be connected to one or more laser control devices 168 via the IC layer 130. The multiple laser control devices 168 can be, for example, TFT devices, CMOS devices, or a combination thereof, and can provide control instructions, power, etc., to the light source 160 to operate the light source 160. Laser control devices 168 can be arranged in a multi-layer array within the detector integrated circuit layer 126, where each laser control device 168 can be in electrical contact with a respective light source 160. In some implementations, the multiple laser control devices 168 can be fabricated on a substrate different from the substrate 127, and electrically connect to the light source 160 to operate the light source 160.

In some implementations, the detector integrated circuit layer 126 is between the detector 122 and the display device 102 such that the reflected NIR light 125 enters the detector 122 through the detector integrated circuit layer 126. In some implementations, the detector 122 is between the detector integrated circuit layer 126 and the display device 102 such that the reflected NIR light 125 enters the detector 122 without passing through the detector integrated circuit layer 126.

Though depicted in FIG. 1C as one light source 160, multiple light sources 160 can be included in the display apparatus 150, where the light sources 160 are distributed in an array having a spacing of one or few pixels. In some implementations, the light sources 160 can be scanning lasers, where an emitted NIR light 164 can be scanned in an arc or another scanning pattern through a range of angles.

Figure 1D:
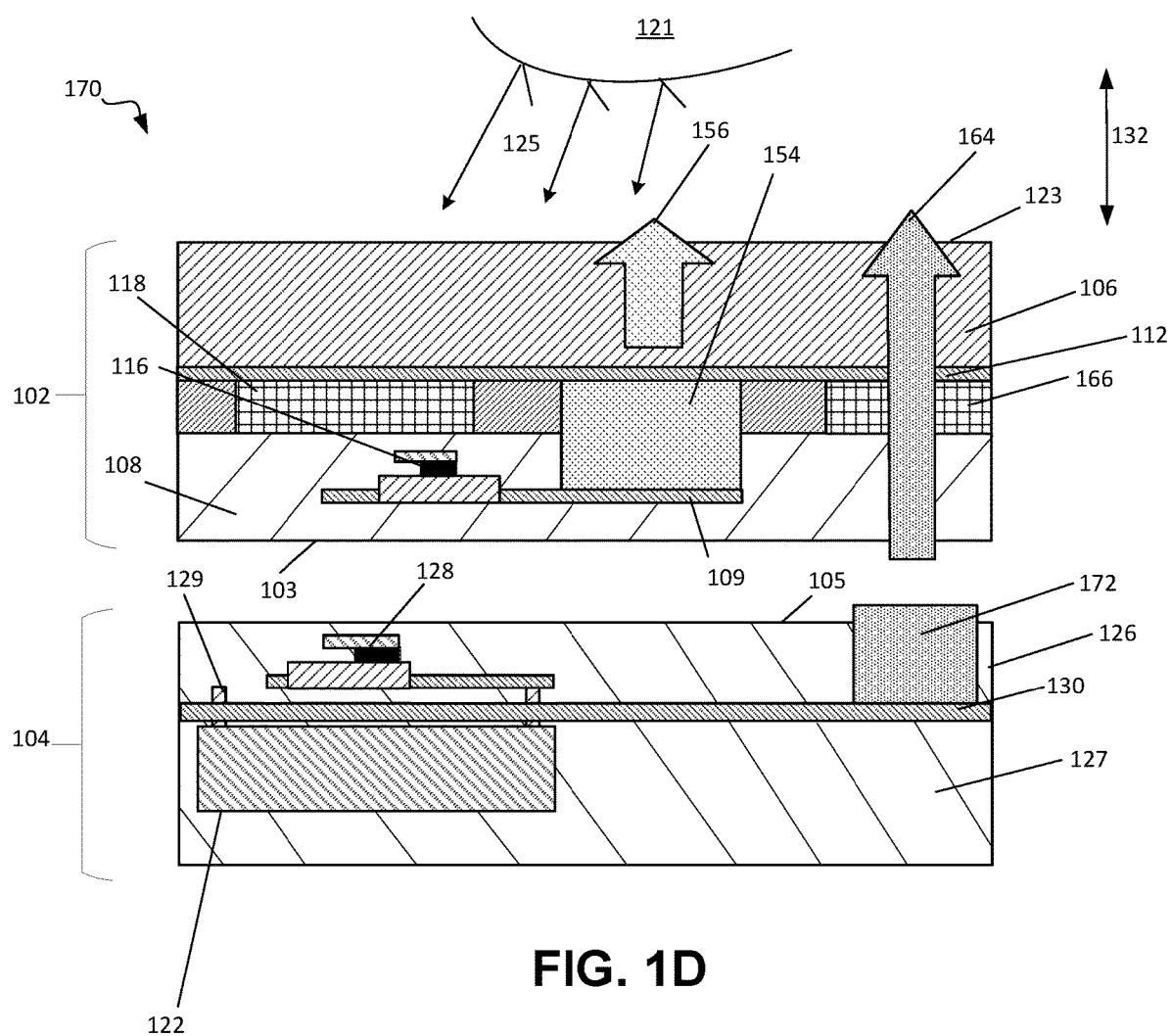

FIG. 1D is a cross-sectional schematic of another example display apparatus 170. Similar to the display apparatus 160 depicted in FIG. 1C, display apparatus 170 includes a detector device 104 where the NIR light source 172 (e.g., light source 160 depicted in FIG. 1C) is separated from the RGB light source 154. Distinctly, display apparatus 170 of FIG. 1D includes a NIR light source 172 that is integrated into the detector device 104. The NIR light source 172 can be fabricated on the detector device 104, e.g., using epitaxial and/or lateral growth methods. Alternatively, the NIR light source 172 can be fabricated and diced separately, and then integrated as a die to the detector device 104 by bonding the die to the substrate 127 of the detector device 104 via the IC layer 130. In some implementations, the detector integrated circuit layer 126 is between the detector 122 and the display device 102 such that the reflected NIR light 125 enters the detector 122 through the detector integrated circuit layer 126. The NIR light source 172 and the detector 122 are respectively at two opposite sides of the IC layer 130. In some implementations, the detector 122 is between the detector integrated circuit layer 126 and the display device 102 such that the reflected NIR light 125 enters the detector 122 without passing through the detector integrated circuit layer 126. The NIR light source 172 and the detector 122 are at the same side of the IC layer 130. The NIR light source 172 may be embedded in the substrate 127 at a position directly under the second filter region 166.

Subsequent to integrating the NIR light source 172 in the detector device 104, the detector device 104 and the display device 102 are bonded together, e.g., using wafer/die bonding techniques, at the first surface 103 and the second surface 105, as described above with reference to FIG. 1A.

Figure 1E:
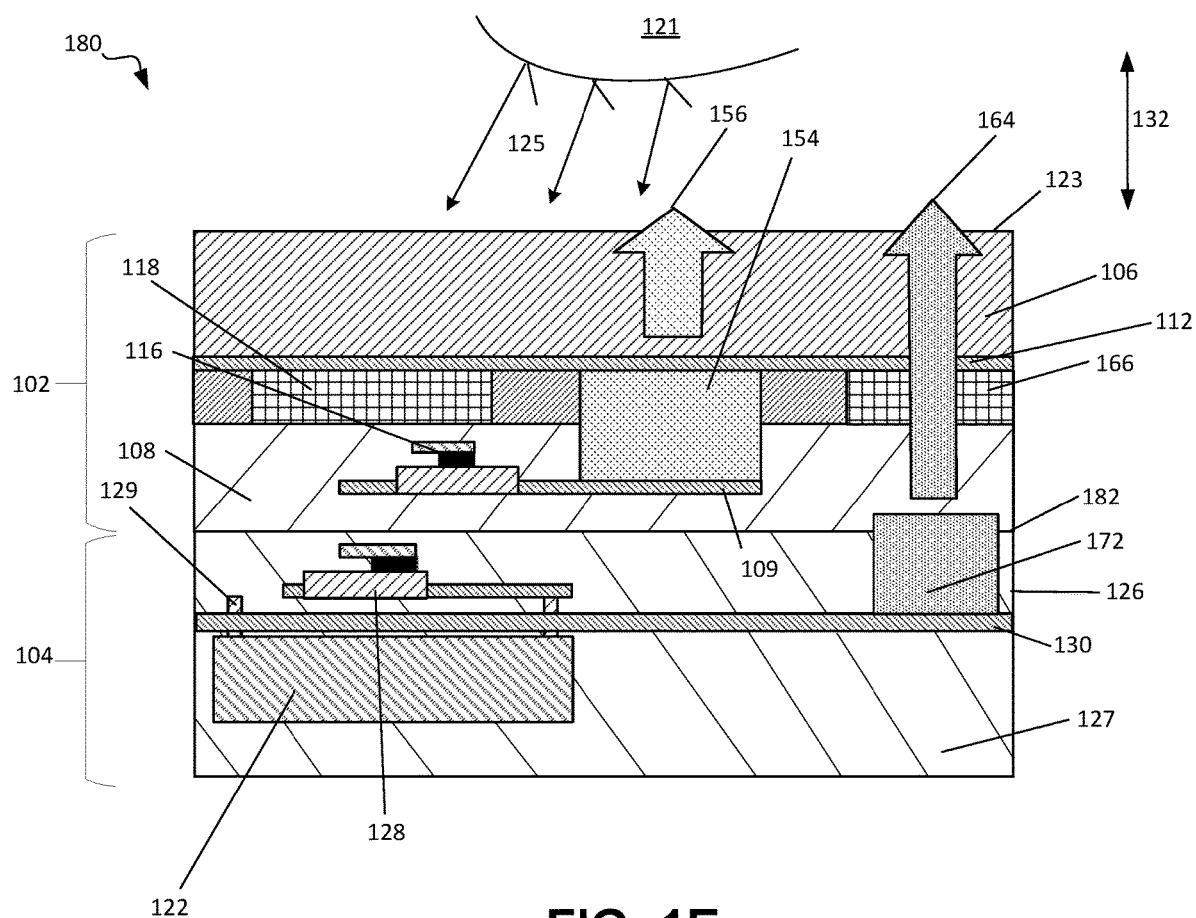

FIG. 1E is a cross-sectional schematic of another example display apparatus 180. The display apparatus 180 depicted in FIG. 1E is a monolithically integrated structure of the display apparatus 170 described above with reference to FIG. 1D. Monolithic integration of the display apparatus 180 includes a display device 102 and a detector device 104 that are fabricated using monolithic fabrication techniques, e.g., epitaxial and/or lateral growth techniques, that does not involve a mechanical bonding step to unify the display device 102 and the detector device 104 at the interface 182.

In some implementations, the NIR light source 172 can protrude into the display integrated control layer 108 (e.g., the a-Si layer) of the display device 102, where growth of the a-Si layer for the display integrated control layer 108 using monolithic integration techniques can be, in part, a lateral growth of a-Si over the NIR light source 172.

In some implementations, the NIR light source 172 can be beneath the a-Si layer of the display device, where the NIR light source 172 is embedded within the detector device 104 and below the interface 182, such that the NIR light source 172 is not located within the display device 102.

In some implementations, thermal budget constraints can determine fabrication processes available for fabricating the monolithically integrated structure of display apparatus 180. For example, detector 122 can be a Ge detector and has a thermal budget of 800° C., where any structures of the display apparatus 140 that are fabricated after the Ge detector 122 are restricted to not exceed 800° C. In another example, NIR light source 172 can be an InGaAs/InP VCSEL and has a thermal budget not exceeding 600° C. after the NIR light source 172 is epitaxially and/or laterally grown on the IC layer 130 of the detector device 104.

In some implementations, the display apparatus 180 can be fabricated utilizing both a mechanical bonding technique and a monolithic integrated technique. For example, the display device 102 and the detector device 104 may each be monolithically integrated and then mechanically bonded together at interface 182, e.g., where the detector device 104 does not consist of two substrates bonded together with an IC layer 130 but is fabricated as a single device monolithically. In another example, the detector device 104 can include a bonding step to integrate the NIR light source 172 with the detector device 104, e.g., to bond the NIR light source 172 with the IC layer 130, and where other aspects of the display apparatus (e.g., the detector integrated circuit layer 126 and the display device 102) are fabricated using monolithic integrated techniques. In some implementations, the detector integrated circuit layer 126 is between the detector 122 and the display device 102 such that the reflected NIR light 125 enters the detector 122 through the detector integrated circuit layer 126. The NIR light source 172 and the detector 122 are respectively at two opposite sides of the IC layer 130. In some implementations, the detector 122 is between the detector integrated circuit layer 126 and the display device 102 such that the reflected NIR light 125 enters the detector 122 without passing through the detector integrated circuit layer 126. The NIR light source 172 and the detector 122 are at the same side of the IC layer 130. In some implementations, the NIR light source 172 may be embedded in the substrate 127 at a position directly under the second filter region 166.

In some embodiments, the detector device 102 depicted in FIGS. 1A through 1E includes a detector integrated layer 126 including amorphous silicon (a-Si), polycrystalline silicon (p-Si), or other types of silicon rather than crystalline silicon, where the detector control circuits 128 are TFT devices rather than CMOS devices. FIGS. 2A through 2E depict these embodiments of display apparatuses which include a detector integrated layer including a-Si/p-Si/other types of silicon and corresponding detector control circuits that are TFT devices.

Figure 2A:
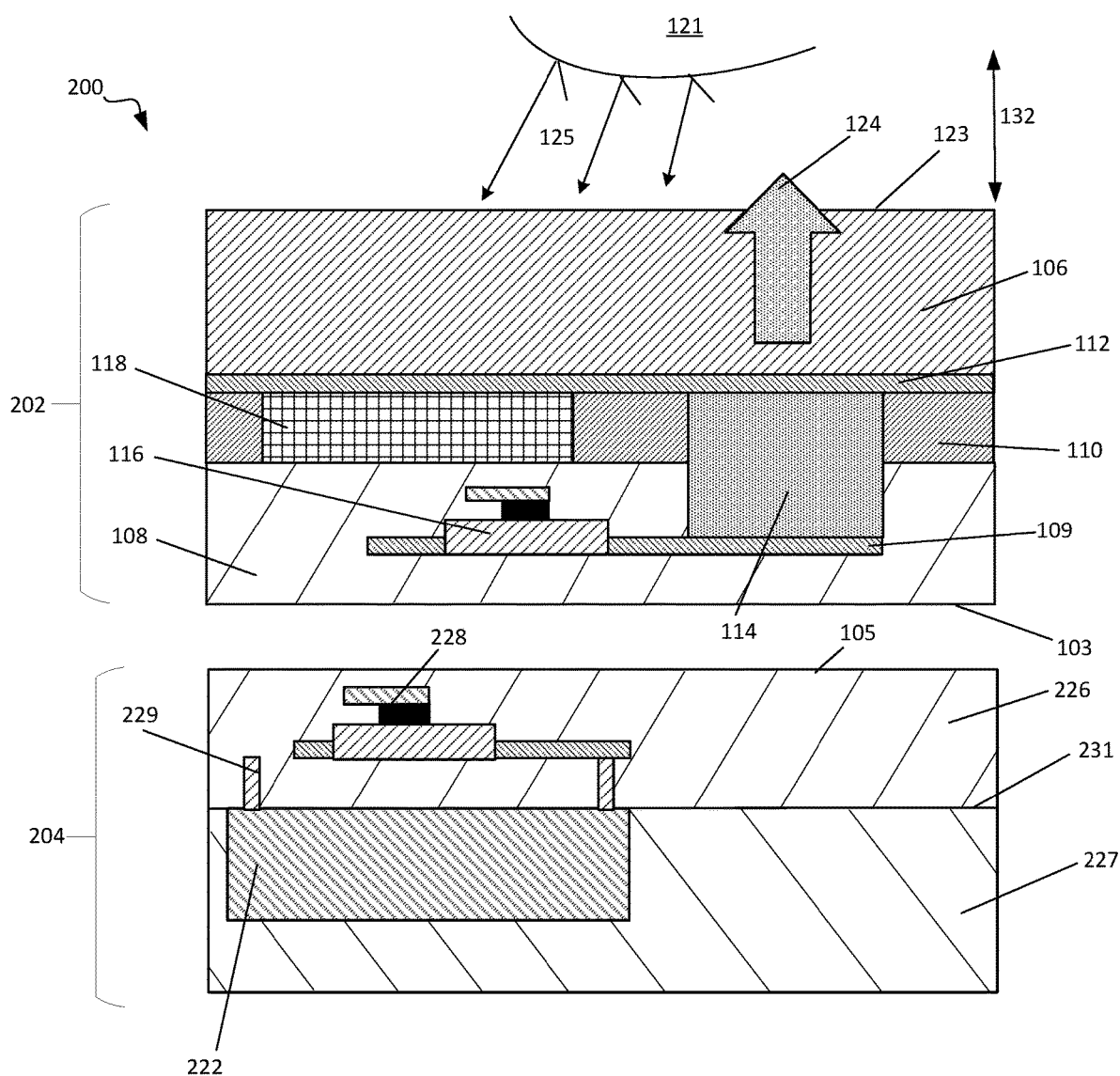
FIGS. 2A through 2E are cross-sectional schematics of example display apparatuses.

FIG. 2A is a cross-sectional schematic of another example display apparatus 200. Display apparatus 200 includes a display device 202 (e.g., display device 102 as describe with reference to FIG. 1A) and a detector device 204. As noted above, detector device 204 is distinct from detector device 104 described above with reference to FIG. 1A in that the detector integrated layer 226 of the detector device 204 includes amorphous silicon, polycrystalline silicon, or other types of silicon that are not crystalline silicon, and the multiple detector control devices 228 are TFT devices.

In some implementations, detector 222 of the detector device 204 is supported by the substrate 227 (e.g., a crystalline silicon substrate) and the subsequently, the detector integrated layer 226 is fabricated on a surface 231 of the substrate 227 including one or more a-Si/p-Si/other types of silicon layers and multiple detector control circuits 228. In some implementations, the detector integrated circuit layer 226 is between the detector 222 and the display device 202 such that the reflected NIR light 125 enters the detector 222 through the detector integrated circuit layer 226. In some implementations, the detector 222 is between the detector integrated circuit layer 226 and the display device 202 such that the reflected NIR light 125 enters the detector 222 without passing through the detector integrated circuit layer 226.

As depicted in FIG. 2A, the detector device 204 does not include the same IC layer 130 that is described for the display apparatus 100 of FIG. 1A. As such, interconnects 229 are used to electrically connect the detector control circuits 228 and respective detectors 222.

Figure 2B:
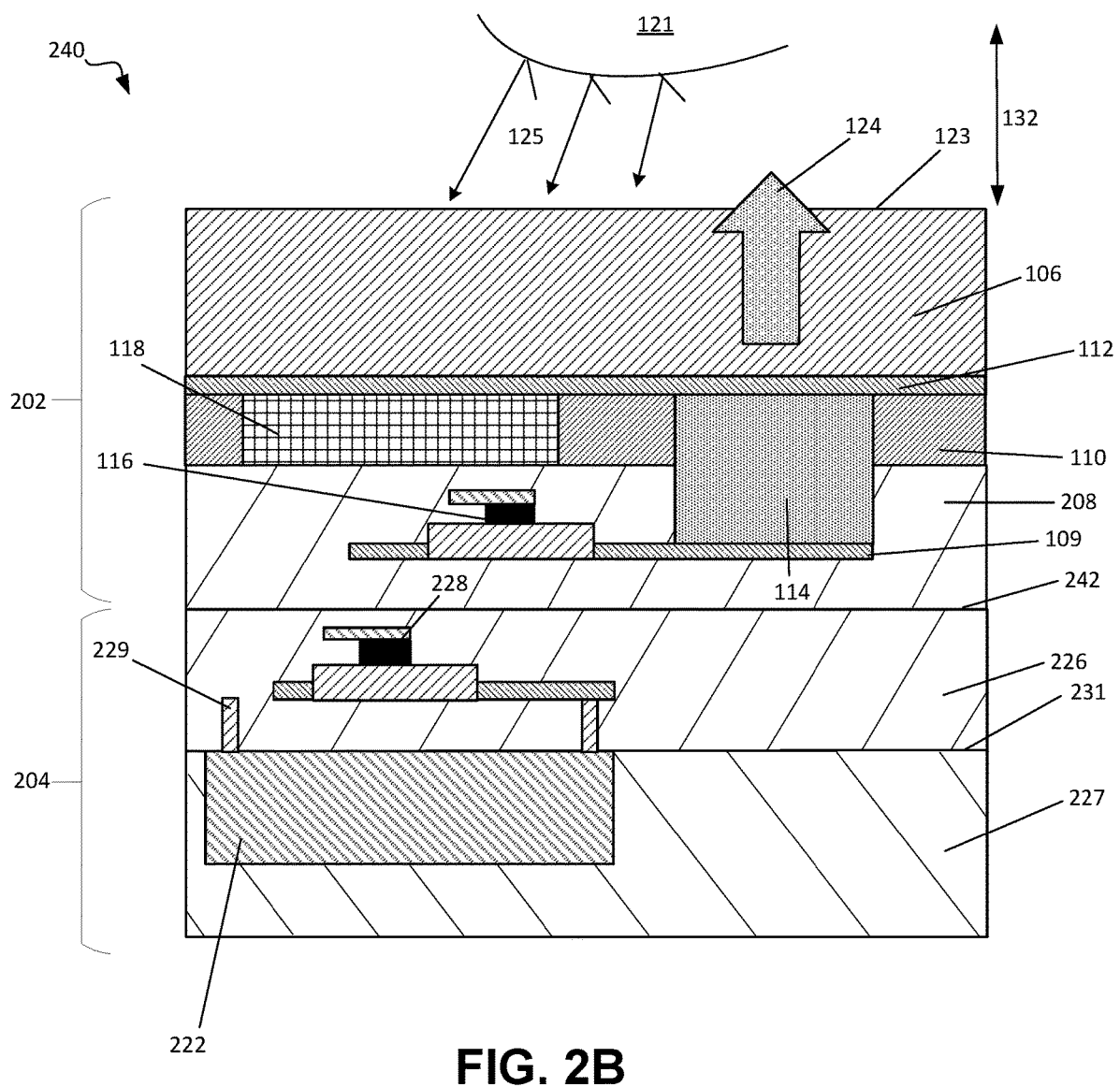

FIG. 2B is a cross-sectional schematic of another example display apparatus 240. The display apparatus 240 depicted in FIG. 2B is a monolithically integrated structure, that is, that the display device 202 and detector device 204 are fabricated using monolithic fabrication techniques, e.g., epitaxial and/or lateral growth techniques, that does not involve a mechanical bonding step to unify the display device 202 and the detector device 204 at the interface 242. The detector integrated circuit layer 226 and display integrated circuit layer 208 both include a-Si/p-Si/other types of silicon material. Thus, a fabrication technique, e.g., epitaxial and/or lateral growth, can be used to epitaxially integrate the detector integrated circuit layer 226 and display integrated circuit layer 208 across the interface 242 between the two layers.

In some implementations, thermal budget constraints can determine fabrication processes available for fabricating the monolithically integrated structure of display apparatus 240. For example, detector 222 can be a Ge detector and has a thermal budget of 800° C., where any structures of the display apparatus 240 that are fabricated after the Ge detector 222 are restricted to not exceed 800° C.

In some implementations, the display apparatus 240 can be fabricated utilizing both a mechanical bonding technique and a monolithic integrated technique. For example, the display device 202 and the detector device 204 may each be monolithically integrated and then mechanically bonded together at interface 242 and where the detector device 204 is fabricated as a single device monolithically. In some implementations, the detector integrated circuit layer 226 is between the detector 222 and the display device 202 such that the reflected NIR light 125 enters the detector 222 through the detector integrated circuit layer 226. In some implementations, the detector 222 is between the detector integrated circuit layer 226 and the display device 202 such that the reflected NIR light 125 enters the detector 222 without passing through the detector integrated circuit layer 226.

Figure 2C:
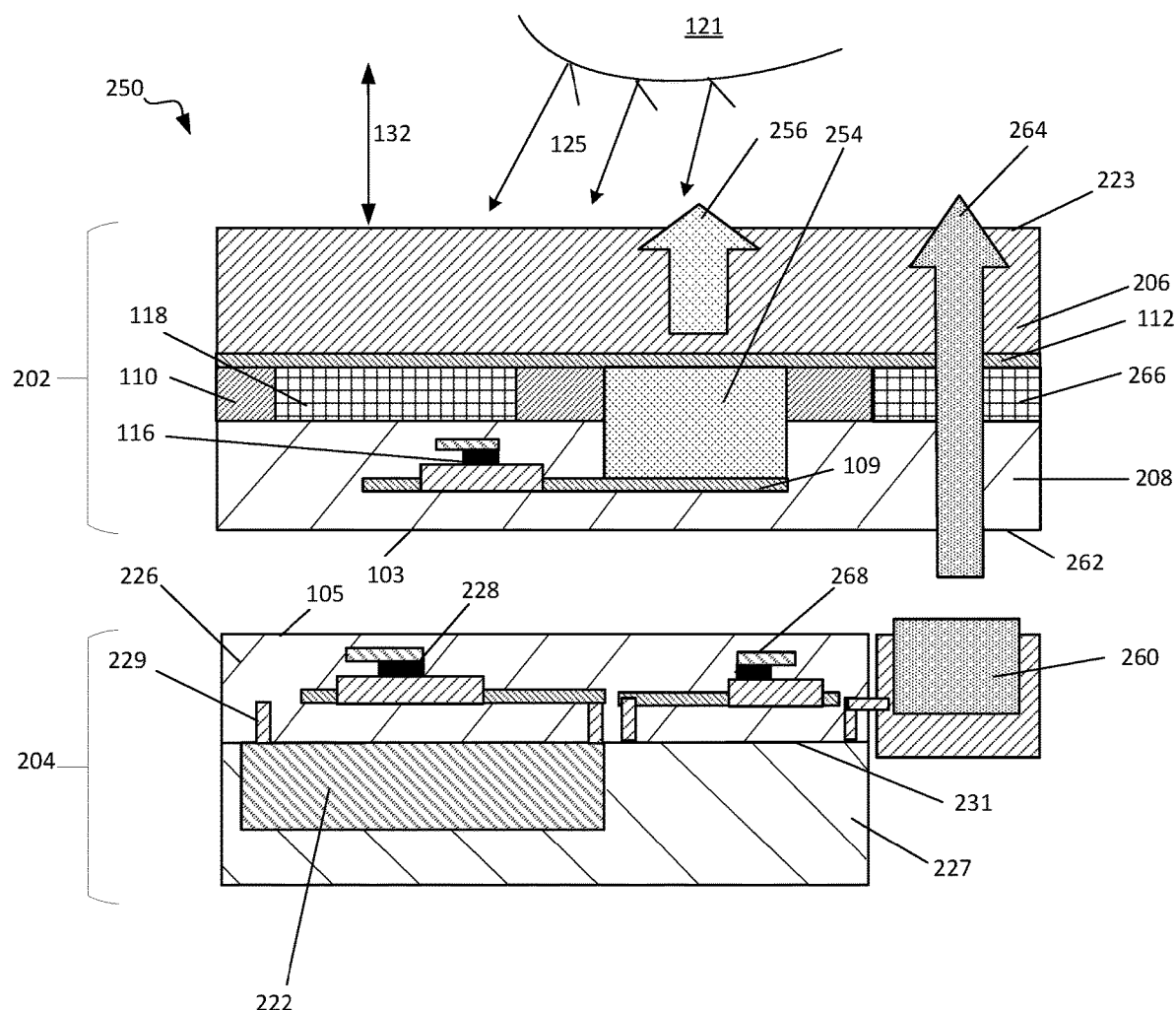

FIG. 2C is a cross-sectional schematic of another example display apparatus 250. Display apparatus 250 includes light sources 254 (e.g., RGB light sources 214) that are integrated into display device 202, where light sources 254 include an array of light sources 254 emitting visible light 256. In contrast to display apparatus 200 depicted in FIG. 2A, display apparatus 250 in FIG. 2C includes a light source 260 that is separately fabricated from the display device 202 and detector device 204 and which is packaged beneath the display device 202 in contact with a surface 262 of the display device 202. Light source 260 is a NIR light source, for example, a packaged laser diode, vertically-cavity surface emitting laser (VCSEL), an edge emission laser (EEL) such as distributed-feedback (DFB) laser or distributed-Bragg reflector (DBR) laser, an organic light-emitting diode (OLED), Micro light emitting diode (LED), LED or the like, that is separately fabricated, diced, and bonded or otherwise attached to a back side of the display device 202 in contact with surface 262. In one example, the light source 260 can be an InGaAs/InP VCSEL.

Light source 260 is positioned and bonded at the back side of the display device 202 such that the light source 260 emits NIR light 264 perpendicular to surface 223 of the transparent layer 206 of the display device 202. Display device 202 additionally can include a second filter region 266 which includes a same composition as first filter region 218 (e.g., first filter region 118 of FIG. 1A). The second filter region 266 is embedded in the shielding layer 210 (e.g., shielding layer 110 of FIG. 1A) and aligned within the shielding layer 210 such that the NIR light 264 emitted by the light source 260 passes through the second filter region 266 when light source 260 is positioned and bonded at the back side of the display device 202. In some implementations, the detector integrated circuit layer 226 is between the detector 222 and the display device 202 such that the reflected NIR light 125 enters the detector 222 through the detector integrated circuit layer 226. In some implementations, the detector 222 is between the detector integrated circuit layer 226 and the display device 202 such that the reflected NIR light 125 enters the detector 222 without passing through the detector integrated circuit layer 226.

Light source 260 is in electrical contact with one or more interconnects 229, where light source 260 can be connected to one or more laser control devices 268 via the interconnects 229. The multiple laser control devices 268 can be, for example, TFTs, CMOS devices, or a combination thereof, and can provide control instructions, power, etc., to the light source 260 to operate the light source 260. Laser control devices 268 can be arranged in a multi-layer array within the detector integrated circuit layer 226, where each laser control device 268 can be in electrical contact with a respective light source 260. In some implementations, the multiple laser control devices 268 can be fabricated on a substrate different from the substrate 227, and electrically connect to the light source 260 to operate the light source 260.

Though depicted in FIG. 2C as one light source 260, multiple light sources 260 can be included in the display apparatus 250, where the light sources 260 are distributed in an array having a spacing of one or few pixels. In some implementations, the light sources 260 can be scanning lasers, where an emitted NIR light 164 can be scanned in an arc or another scanning pattern through a range of angles.

Figure 2D:
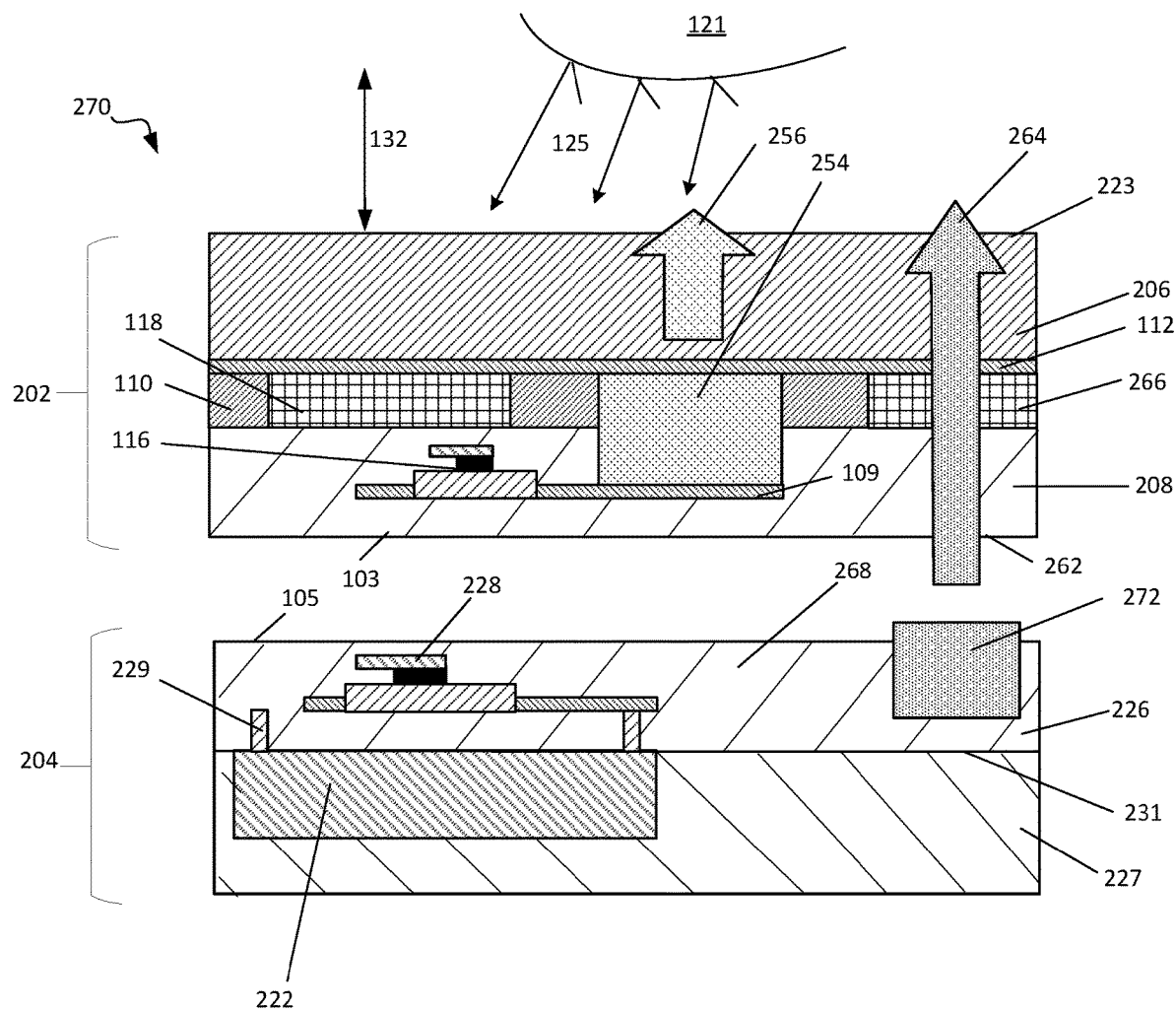

FIG. 2D is a cross-sectional schematic of another example display apparatus 270. Similar to the display apparatus 250 depicted in FIG. 2C, display apparatus 270 includes a detector device 204 where the NIR light source 272 (e.g., light source 260 depicted in FIG. 2C) is separated from the RGB light source 254. Distinctly, display apparatus 270 of FIG. 2D includes a NIR light source 272 that is integrated into the detector device 204. The NIR light source 272 can be fabricated on the detector device 204, e.g., using epitaxial and/or lateral growth methods. As depicted in FIG. 2D, the NIR light source 272 can be fabricated embedded in the a-Si/p-Si/other types of silicon material of the detector integrated circuit layer 226. Alternatively, the NIR light source 272 can be fabricated and diced separately, and then integrated as a die to the detector device 204 by bonding the die to the detector integrated circuit layer 226 of the detector device 204.

In some implementations, the detector integrated circuit layer 226 is between the detector 222 and the display device 202 such that the reflected NIR light 125 enters the detector 222 through the detector integrated circuit layer 226. The NIR light source 272 and the detector 222 are respectively at two opposite sides of the surface 231 of the substrate 227. In some implementations, the detector 222 is between the detector integrated circuit layer 226 and the display device 202 such that the reflected NIR light 125 enters the detector 222 without passing through the detector integrated circuit layer 226. The NIR light source 272 and the detector 222 are at the same side of the surface 231 of the substrate 227. In some implementations, the NIR light source 272 may be embedded in the substrate 227 at a position directly under the second filter region 266.

Subsequent to integrating the NIR light source 272 in the detector device 204, the detector device 204 and the display device 202 are bonded together, e.g., using wafer/die bonding techniques, at the respective interfaces 203 and 205, as described above with reference to detector device 204 and display device 202 in FIG. 1A.

Figure 2E:
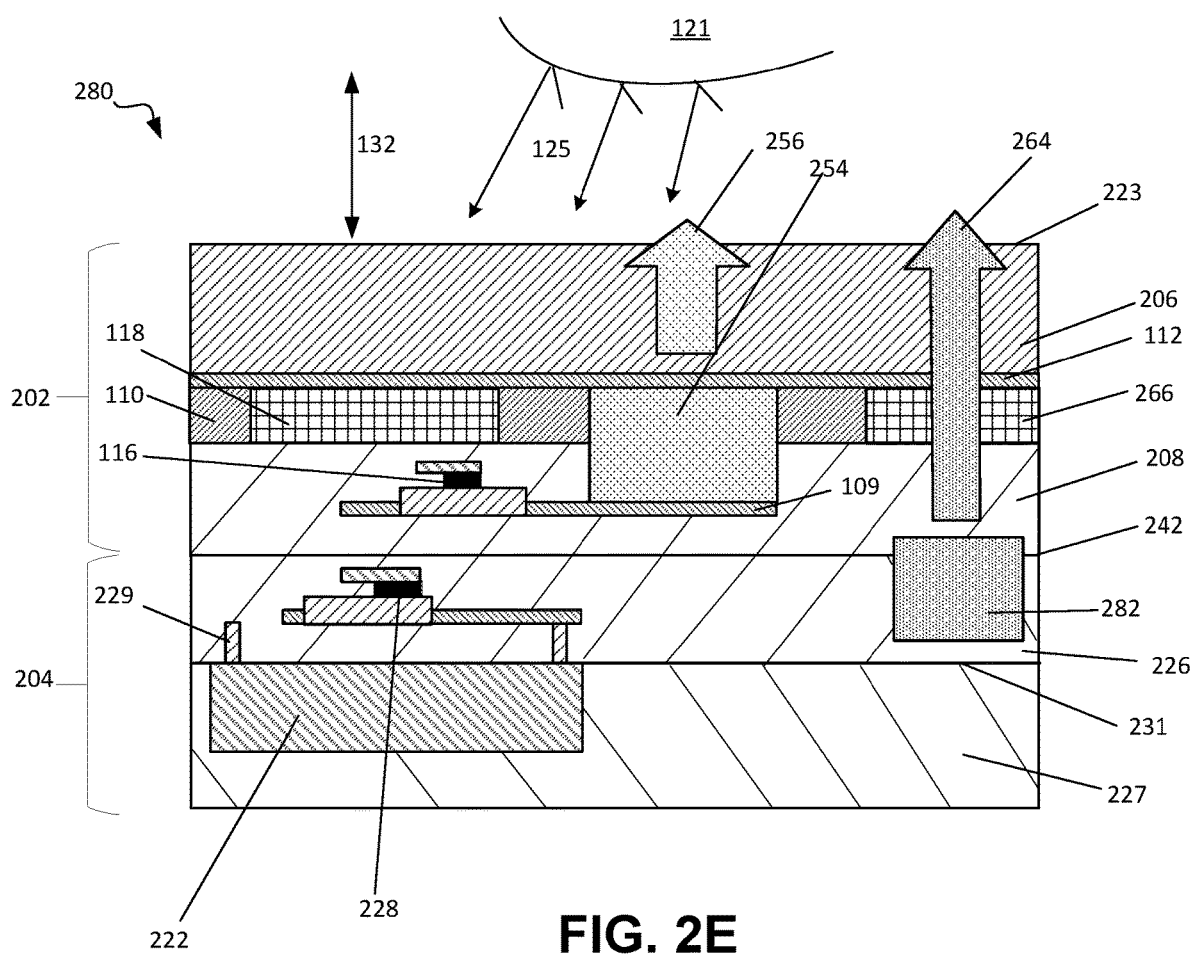

FIG. 2E is a cross-sectional schematic of another example display apparatus 280. The display apparatus 280 depicted in FIG. 2E is a monolithically integrated structure of the display apparatus 270 described above with reference to FIG. 2D. Monolithic integration of the display apparatus 280 includes a display device 202 and detector device 204 that are fabricated using monolithic fabrication techniques, e.g., epitaxial and/or lateral growth techniques, that does not involve a mechanical bonding step to unify the display device 202 and the detector device 204 at the interface 242.

In some implementations, the NIR light source 282 can protrude into the display integrated control layer 208 (e.g., the a-Si layer) of the display device 202, where growth of the a-Si layer for the display integrated control layer 208 using monolithic integration techniques can be, in part, a lateral growth of a-Si over the NIR light source 282.

In some implementations, the NIR light source 282 can be beneath the a-Si layer of the display device, where the NIR light source 282 is embedded within the detector device 204 and below the interface 242, such that the NIR light source 282 is not located within the display device 202.

In some implementations, thermal budget constraints can determine fabrication processes available for fabricating the monolithically integrated structure of display apparatus 180. For example, detector 222 can be a Ge detector and has a thermal budget of 800° C., where any structures of the display apparatus 280 that are fabricated after the Ge detector 222 are restricted to not exceed 800° C. In another example, NIR light source 282 can be an InGaAs/InP VCSEL and has a thermal budget not exceeding 600° C. after the NIR light source 282 is epitaxially and/or laterally grown on the a-Si layer of the detector integrated circuit layer 226 of the detector device 204.

In some implementations, the display apparatus 280 can be fabricated utilizing both a mechanical bonding technique and a monolithic integrated technique. For example, the display device 202 and the detector device 204 may each be monolithically integrated and then mechanically bonded together at interface 242. In another example, the detector device 204 can include a bonding step to integrate the NIR light source 282 with the detector device 204, e.g., to bond the NIR light source 282 to a portion of detector integrated circuit layer 226, and where other aspects of the display apparatus (e.g., the detector integrated circuit layer 226 and the display device 202) are fabricated using monolithic integrated techniques, e.g., epitaxial and/or lateral growth of a-Si/p-Si/other types of silicon surrounding and over the NIR light source 282.

In some implementations, the detector integrated circuit layer 226 is between the detector 222 and the display device 202 such that the reflected NIR light 125 enters the detector 222 through the detector integrated circuit layer 226. The NIR light source 272 and the detector 222 are respectively at two opposite sides of the surface 231 of the substrate 227. In some implementations, the detector 222 is between the detector integrated circuit layer 226 and the display device 202 such that the reflected NIR light 125 enters the detector 222 without passing through the detector integrated circuit layer 226. The NIR light source 272 and the detector 222 are at the same side of the surface 231 of the substrate 227. In some implementations, the NIR light source 272 may be embedded in the substrate 227 at a position directly under the second filter region 266.

Fabrication Techniques for Display Apparatus

The various aspects of the display apparatus 100 as depicted in FIG. 1A can be fabricated, for example, using complementary metal-oxide-semiconductor (CMOS) microfabrication techniques, e.g., photolithography processes, etching processes, deposition processes, and the like. In some embodiments, fabrication of the display apparatus 100 can include epitaxial and/or lateral growth of one or more layers of material (e.g., Si, SiGe, or Ge).

The various layers described in the display apparatus 100 can be grown on silicon substrates using various vacuum techniques, e.g., chemical-vapor deposition (CVD), metal-organic chemical vapor deposition (MOCVD), molecular beam epitaxy (MBE), atomic layer deposition (ALD), or the like. In some implementations, the shielding layer 110 is a polymeric material that can be can be spin-coated or sputtered over the display integrated circuit layer 108.

A germanium detector 122 can be formed embedded in the silicon substrate 127, for example, using epitaxial growth such as CVD, MOCVD, MBE, ALD, or any suitable method. Alternate detector configurations are described in further detail with reference to FIGS. 3 and 4 below.

Interconnects 129 and IC layer 130 can be fabricated on the display apparatus 100 in contact with respective detector control circuits 128, using, for example a process including a deposition, lift-off, or etching step. Deposition can be performed using, for example, a metal evaporation.

Example Photodetector Devices and Operation

Detectors 122 and 222 described generally with reference to FIGS. 1A and 2A can be Ge or SiGe detectors. In general, a Ge or SiGe detector can be used to absorb NIR photons and convert optical signal into electrical signal. In some implementations, the detector (e.g., detector 122) can be replaced by a single-output photodetector or dual-output photodetector, and can be used to perform time-of-flight detection measurements when incorporated in the display apparatuses described herein.

In time-of-flight (TOF) detection measurements, depth information of a three-dimensional object (e.g., object 121) may be determined using a phase difference between a transmitted light pulse and a detected light pulse, e.g., a NIR light pulse from NIR light source 114. For example, a two-dimensional array of pixels may be used to reconstruct a three-dimensional image of a three-dimensional object, where each pixel may include one or more photodetectors (e.g., detectors 122) for deriving depth information of the three-dimensional object. In some implementations, time-of-flight applications use light sources having wavelengths in the near-infrared (NIR) range. For example, a light-emitting-diode (LED) may have a wavelength of 850 nm, 940 nm, 1064 nm, or 1310 nm, or 1550 nm. For TOF applications using NIR wavelengths, a multi-gate photodetector using germanium-silicon (GeSi) or a germanium (Ge) as the absorption material can be utilized.

Figure 3:
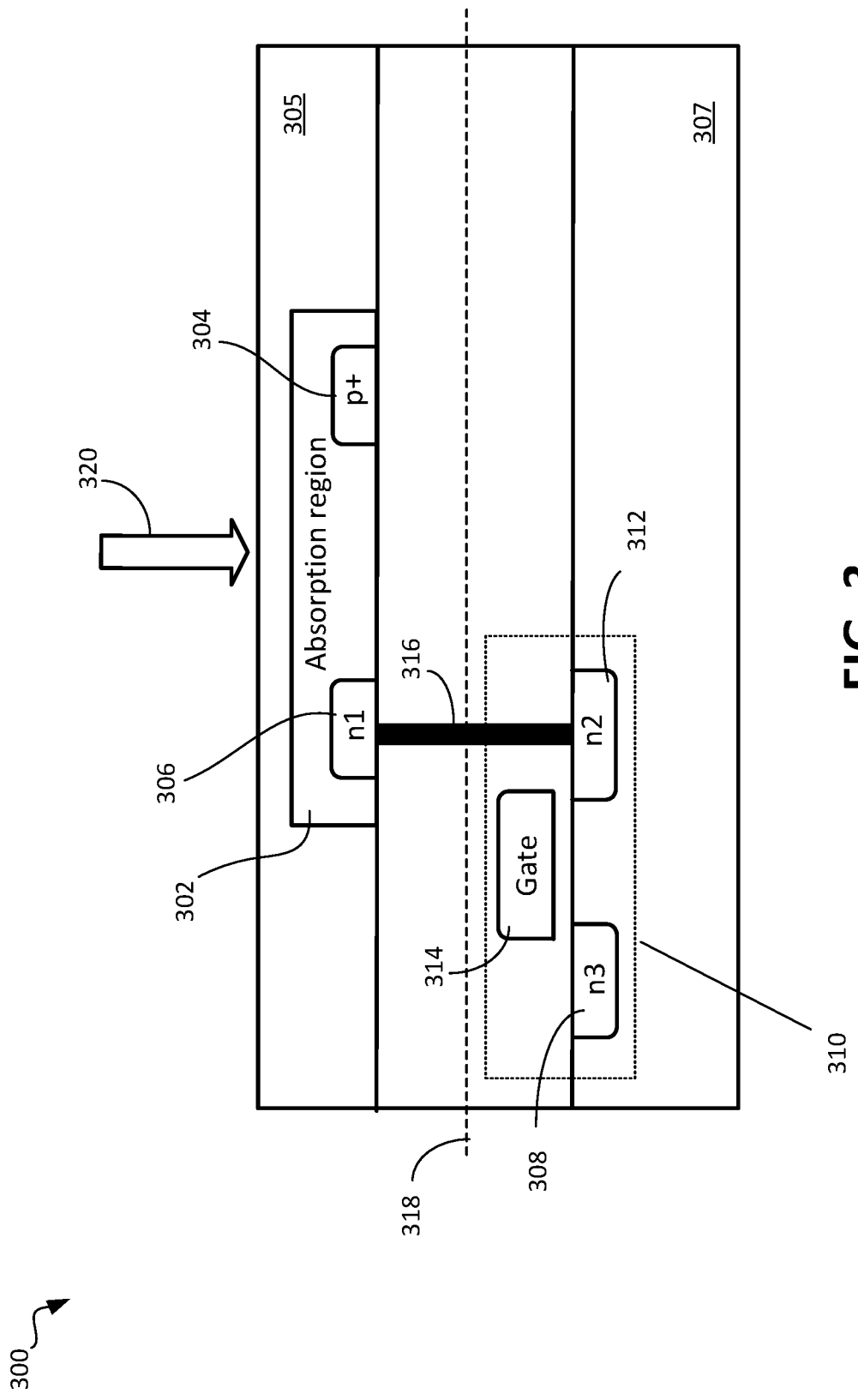
FIG. 3 is a circuit diagram of an example detector device.

FIG. 3 is a circuit diagram of an example single-output detector device 300.

Absorption region 302, the p-doped region 304, and the first n-doped region 306 are supported by a first semiconductor layer 305, and the second n-doped region 312, the gate 314, and the floating-diffusion capacitor 308 are supported by a second semiconductor layer 307. The first semiconductor layer 305 and the second semiconductor layer 307 may be semiconductor wafers, such as a silicon wafer used in standard integrated circuit fabrication processes.

The p-doped region 304 is arranged on a first surface of the absorption region 302 facing away from a top surface of the first semiconductor layer 305. The p-doped region 304 may repel the photo-electrons from the surface of the absorption region 302 and may thereby increase the device bandwidth. For example, the p-doped region 304 may have a p+ doping, where the dopant concentration is as high as a fabrication process may achieve, e.g., about $5 \times 10^{20}$ cm$^{-3}$, when the absorption region 302 is germanium and doped with boron.

The n-doped region 306 is arranged on the first surface of the absorption region 302 facing away from the top surface of the first semiconductor layer 305. The n-doped region 306 may be formed by implantation of dopants into the absorption region 302.

The first semiconductor layer 305 may be separately processed from the second semiconductor layer 307. For example, the first semiconductor layer 305 may be processed using a first fabrication process specialized for forming absorption region 302, and the second semiconductor layer 307 may be processed using a second fabrication process specialized for forming the gate 314. The second fabrication process may be, for example, a sub 100 nm CMOS fabrication process for forming high-density digital circuits. A first portion of the interconnect 316 may be fabricated during the processing of the first semiconductor layer 305, and a second portion of the interconnect 316 may be fabricated during the processing of the second semiconductor layer 307. The processed first and second semiconductor layers 305 and 307 may then be bonded at a bonding interface 318, mechanically coupling the first and second semiconductor layers 305 and 307, and electrically coupling the absorption region 302 to the second n-doped region 312. The entity that results from bonding of the first and second layers 305 and 307 may be referred to as a substrate.

The bonding of the first and semiconductor layers 305 and 307 may optically obscure the first surface of the absorption region 302 facing the second semiconductor layer 307. As such, an optical signal 320 may enter the absorption region 302 from a top surface of the first semiconductor layer 305 opposite to a bottom surface where the absorption region 302 is formed.

The general operation of the detector device 300 is as follows. Photo-generated carriers such as electrons generated by the absorption region 302 may be repelled by the p-doped region 304 toward the first n-doped region 306. Once the photo-generated carriers reach the first n-doped region 304, additional force may be imparted on the carriers to induce a flow of those carriers from the first n-doped region 306 to the floating-diffusion capacitor 308 when the MOSFET 310 is turned on. Such force may be generated by engineering of the doping concentrations n1 of the first n-doped region 306, n2 of the second n-doped region 312, and n3 of the floating-diffusion capacitor 308. In general, a charge carrier is driven from a region of low doping concentration to a region of high doping concentration, as the potential energy associated with a region of lower doping concentration is higher than the potential energy associated with a region of higher doping concentration. As such, by setting the doping concentrations according to an inequality n3>n2>n1, the carriers stored at the first n-doped region 306 may be first driven toward the second n-doped region 312 having the second doping concentration n2 higher than the first doping concentration n1. Then, when the MOSFET 310 is turned on, the difference in doping concentration n2 of the second n-doped region 312 and n3 of the floating-diffusion capacitor 308 further drives the carriers toward the floating-diffusion capacitor 308. As a result, the carrier transfer efficiency from the absorption region 302 to the floating-diffusion capacitor 308 may be improved.

Figure 4:
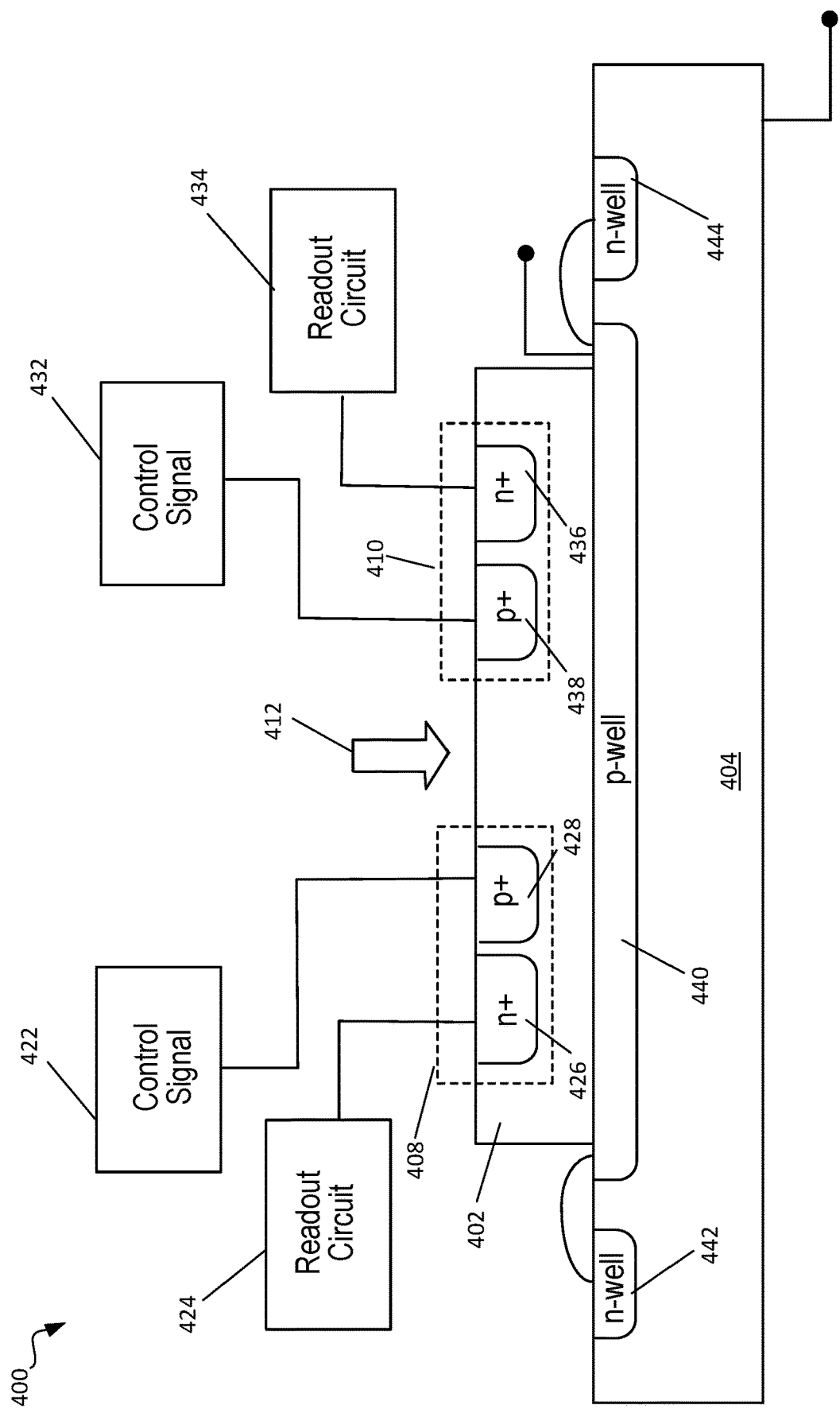
FIG. 4 is a circuit diagram of another example detector device.

FIG. 4 is a circuit diagram of an example dual-output detector 400. The detector 400 is a switched photodetector for converting an optical signal to an electrical signal. The detector 400 includes an absorption layer 402 fabricated on a substrate 404. The substrate 404 may be any suitable substrate where semiconductor devices can be fabricated on. For example, the substrate 404 may be a silicon substrate. The absorption layer 402 includes a first switch 408 and a second switch 410.

In general, the absorption layer 402 receives an optical signal 412 and converts the optical signal 412 into electrical signals. The absorption layer 402 may be intrinsic, p-type, or n-type. In some implementations, the absorption layer 402 may be formed from a p-type GeSi material. In some implementations, the absorption layer 402 may be composed of Ge. The absorption layer 402 is selected to have a high absorption coefficient at the desired wavelength range. For NIR wavelengths, the absorption layer 402 may be a GeSi mesa, where the GeSi absorbs photons in the optical signal 412 and generates electron-hole pairs. The material composition of germanium and silicon in the GeSi mesa may be selected for specific processes or applications.

In some implementations, the absorption layer 402 is designed to have a thickness t. For example, for 850 nm or 940 nm wavelength, the thickness of the GeSi mesa may be approximately 1 µm to have a substantial quantum efficiency. In some implementations, the absorption layer 402 includes germanium and is designed to absorb photons having a wavelength between 800 nm and 2000 nm, the thickness t of the absorption layer 402 is between 0.1 microns and 2.5 microns. In some embodiments, the thickness t of the absorption layer 10 is between 0.5 microns and 5 microns for higher quantum efficiency. In some implementations, the surface of the absorption layer 402 is designed to have a specific shape. For example, the GeSi mesa may be circular, square, or rectangular depending on the spatial profile of the optical signal 412 on the surface of the GeSi mesa. In some implementations, the absorption layer 402 is designed to have a lateral dimension d for receiving the optical signal 412. For example, the GeSi mesa may have a circular or a rectangular shape, where d can range from 1 µm to 50 µm.

A first switch 408 and a second switch 410 have been fabricated in the absorption layer 402. The first switch 408 is coupled to a first control signal 422 and a first readout circuit 424. The second switch 410 is coupled to a second control signal 432 and a second readout circuit 434. In general, the first control signal 422 and the second control signal 432 control whether the electrons or the holes generated by the absorbed photons are collected by the first readout circuit 424 or the second readout circuit 434.

In some implementations, the first switch 408 and the second switch 410 may be fabricated to collect electrons. In this case, the first switch 408 includes a p-doped region 428 and an n-doped region 426. For example, the p-doped region 428 may have a p+doping, where the activated dopant concentration may be as high as a fabrication process may achieve, e.g., the peak concentration may be about $5 \times 10^{20}$ $cm^{-3}$ when the absorption layer 402 is germanium and doped with boron. In some implementation, the doping concentration of the p-doped region 428 may be lower than $5 \times 10^{20}$ $cm^{-3}$ to ease the fabrication complexity at the expense of an increased contact resistance. The n-doped region 426 may have an n+ doping, where the activated dopant concentration may be as high as a fabrication process may achieve, e.g., the peak concentration may be about $1 \times 10^{20}$ $cm^{-3}$ when the absorption layer 402 is germanium and doped with phosphorous. In some implementation, the doping concentration of the n-doped region 426 may be lower than $1 \times 10^{20}$ $cm^{-3}$ to ease the fabrication complexity at the expense of an increased contact resistance. The distance between the p-doped region 428 and the n-doped region 426 may be designed based on fabrication process design rules. In general, the closer the distance between the p-doped region 428 and the n-doped region 426, the higher the switching efficiency of the generated photo-carriers. However, reducing of the distance between the p-doped region 428 and the n-doped region 426 may increase a dark current associated with a PN junction formed between the p-doped region 428 and the n-doped region 426. As such, the distance may be set based on the performance requirements of the switched photodetector 100. The second switch 410 includes a p-doped region 438 and an n-doped region 436. The p-doped region 438 is similar to the p-doped region 428, and the n-doped region 436 is similar to the n-doped region 426.

In some implementations, the p-doped region 428 is coupled to the first control signal 422. For example, the p-doped region 428 may be coupled to a voltage source, where the first control signal 422 may be an AC voltage signal from the voltage source. In some implementations, the n-doped region 426 is coupled to the readout circuit 424. The readout circuit 424 may be in a three-transistor configuration consisting of a reset gate, a source-follower, and a selection gate, a circuit including four or more transistors, or any suitable circuitry for processing charges. In some implementations, the readout circuit 424 may be fabricated on the substrate 404. In some other implementations, the readout circuit 424 may be fabricated on another substrate and integrated/co-packaged with the detector 400 via wafer/die bonding or chip stacking.

The p-doped region 438 is coupled to the second control signal 432. For example, the p-doped region 438 may be coupled to a voltage source, where the second control signal 432 may be an AC voltage signal having an opposite phase from the first control signal 422. In some implementations, the n-doped region 436 is coupled to the readout circuit 434. The readout circuit 434 may be similar to the readout circuit 424.

The first control signal 422 and the second control signal 432 are used to control the collection of electrons generated by the absorbed photons. For example, when voltages are used, if the first control signal 422 is biased against the second control signal 432, an electric field is created between the p-doped region 428 and the p-doped region 438, and free electrons drift towards the p-doped region 428 or the p-doped region 438 depending on the direction of the electric field. In some implementations, the first control signal 422 may be fixed at a voltage value Vi, and the second control signal 432 may alternate between voltage values $V_i \pm \Delta V$. The direction of the bias value determines the drift direction of the electrons. Accordingly, when one switch (e.g., the first switch 408) is switched "on" (i.e., the electrons drift towards the p-doped region 428), the other switch (e.g., the second switch 410) is switched "off" (i.e. the electrons are blocked from the p-doped region 438). In some implementations, the first control signal 422 and the second control signal 432 may be voltages that are differential to each other.

In general, a difference (before equilibrium) between the Fermi level of a p-doped region and the Fermi level of an n-doped region creates an electric field between the two regions. In the first switch 408, an electric field is created between the p-doped region 428 and the n-doped region 426. Similarly, in the second switch 410, an electric field is created between the p-doped region 438 and the n-doped region 436. When the first switch 408 is switched "on" and the second switch 410 is switched "off", the electrons drift toward the p-doped region 428, and the electric field between the p-doped region 428 and the n-doped region 426 further carries the electrons to the n-doped region 426. The readout circuit 424 may then be enabled to process the charges collected by the n-doped region 426. On the other hand, when the second switch 410 is switched "on" and the first switch 408 is switched "off", the electrons drift toward the p-doped region 438, and the electric field between the p-doped region 438 and the n-doped region 436 further carries the electrons to the n-doped region 436. The readout circuit 434 may then be enabled to process the charges collected by the n-doped region 436.

In some implementations, a voltage may be applied between the p-doped and the n-doped regions of a switch to operate the switch in an avalanche regime to increase the sensitivity of the switched photodetector 400. For example, in the case of an absorption layer 402 including GeSi, when the distance between the p-doped region 428 and the n-doped region 426 is about 100 nm, it is possible to apply a voltage that is not greater than 7 V to create an avalanche gain between the p-doped region 428 and the n-doped region 426.

In some implementations, the substrate 404 may be coupled to an external control. For example, the substrate 404 may be coupled to an electrical ground, or a preset voltage less than the voltages at the n-doped regions 426 and 436. In some other implementations, the substrate 404 may be floated and not coupled to any external control.

The detector 400 further includes a p-well region 440 and n-well regions 442 and 444. In some implementations, the doping level of the n-well regions 442 and 444 may range from $10^{16}$ cm$^{-3}$ to $10^{20}$ cm$^{-3}$. The doping level of the p-well region 440 may range from $10^{16}$ cm$^{-3}$ to $10^{20}$ cm$^{-3}$.

In some implementation, the absorption layer 402 may not completely absorb the incoming photons in the optical signal 412. For example, if the GeSi mesa does not completely absorb the incoming photons in the NIR optical signal 412, the NIR optical signal 412 may penetrate into the silicon substrate 404, where the silicon substrate 404 may absorb the penetrated photons and generate photo-carriers deeply in the substrate that are slow to recombine. These slow photo-carriers negatively affect the operation speed of the switched photodetector. Moreover, the photo-carries generated in the silicon substrate 404 may be collected by the neighboring pixels, which may cause unwanted signal cross-talks between the pixels. Furthermore, the photo-carriers generated in the silicon substrate 404 may cause charging of the substrate 404, which may cause reliability issues in the switched photodetector.

To further remove the slow photo-carriers, the detector 400 may include connections that short the n-well regions 442 and 444 with the p-well region 440. For example, the connections may be formed by a silicide process or a deposited metal pad that connects the n-well regions 442 and 444 with the p-well region 440. The shorting between the n-well regions 442 and 444 and the p-well region 440 allows the photo-carriers generated in the substrate 404 to be recombined at the shorted node, and therefore improves the operation speed and/or reliability of the switched photodetector. In some implementation, the p-well region 440 is used to passivate and/or minimize the electric field around the interfacial defects between the absorptive layer 402 and the substrate 404 in order to reduce the device dark current.

Though some embodiments of photodetectors are described with reference to FIGS. 3 and 4 herein, other embodiments are possible. For example, additional suitable embodiments are described in US Patent Application 2018/0247968 A1 published on Aug. 30, 2018, US Patent Application 2018/0233521 A1 published on Aug. 16, 2018, the entire contents of which are incorporated herein by reference.

Example Embodiment of a Liquid Crystal-based Display Apparatus

In some embodiments, the display apparatus includes a liquid crystal display (LCD). The display device can include a liquid crystal layer between a first electrode area and a second electrode area. The display apparatus can further include a backlight module positioned under the display device, and a first and a second polarizer film sandwiching the liquid crystal layer. A color filter can be located between the first polarizer and the second polarizer. A detector device can be located between the backlight module and the display device.

Figure 5A:
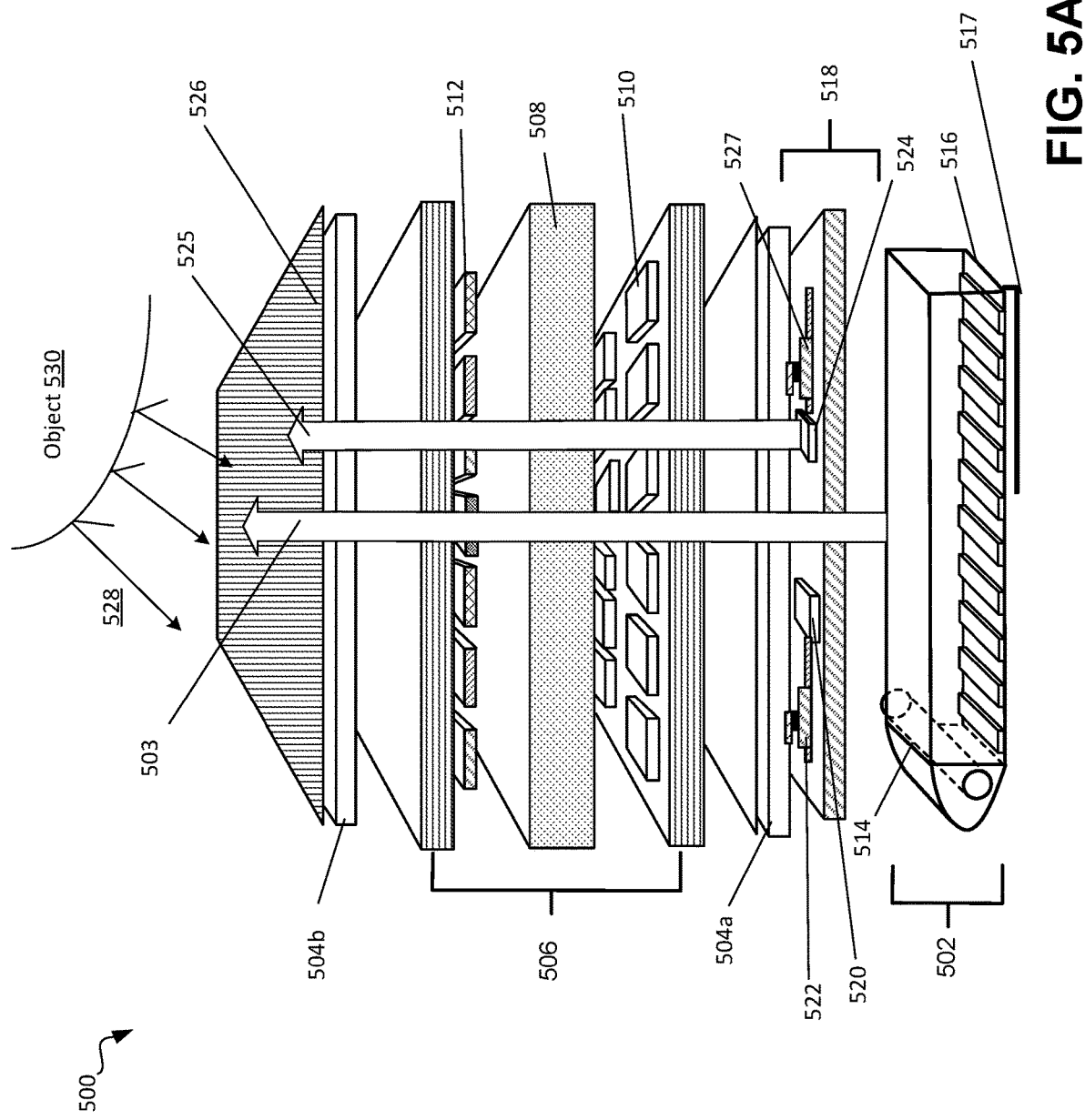
FIGS. 5A and 5B are schematics of example display apparatuses.

FIG. 5A is a schematic of an example liquid crystal-based display apparatus 500, which includes a backlight module 502 emitting visible light 503, a rear polarizer 504a and a front polarizer 504b, and a glass substrate module 506. The glass substrate module 506 includes the liquid crystal layer 508, a TFT circuits layer 510, and a color filter layer 512. The backlight module 502 includes a backlight source 514, e.g., LEDs or fluorescent lamp, a light guiding plate 516, and, optionally, a reflector 517.

Additionally, the display apparatus 500 includes a detector module 518, including multiple detectors 520 (e.g., detectors 122 as described in FIG. 1A) and multiple detector control circuits 522 (e.g., detector control circuits 128 in FIG. 1A). Detector module 518 also includes an NIR light source 524, e.g., an NIR laser diode, NIR OLEDs, NIR Micro LEDS, or the like. Detector module 518, as described as the detector device 104 with reference to FIGS. 1A through 1E, can include a detector integrated circuit layer (e.g., detector integrated circuit layer 126) including an array of multiple detector control circuits 522 in electrical contact with the multiple detectors 520.

In some implementations, as described with reference to detector device 104 in FIG. 1C and detector device 204 in FIG. 2C, each NIR light source 524 of the multiple NIR light sources is in electrical contact with at least one laser control circuit 527. NIR light source 524 is a laser diode, e.g., an NIR VCSEL that is separately fabricated, diced and bonded to the detector device and electrically connected to the detector module 518 via the one or more laser control circuits 527.

In some implementations, as described with reference to detector device 104 in FIG. 1D and detector device 204 in FIG. 2D, the NIR light source 524 is a laser diode, e.g., a NIR VCSEL, that is monolithically fabricated on the detector module 518 and electrically connected to the detector module 518 via the one or more laser control circuits 527.

In some implementations, as depicted by example liquid crystal-based display apparatus 501 in FIG. 5A, the detector module 518 is located between the backlight module 502 and the rear polarizer 504a, where NIR light 525 from the NIR light source 524 is directed substantially normal to a surface 526 of the display apparatus 500. Reflected NIR light 528 that is reflected from an object 530 can be absorbed by a detector 520 in the detector module 518.

Figure 5B:
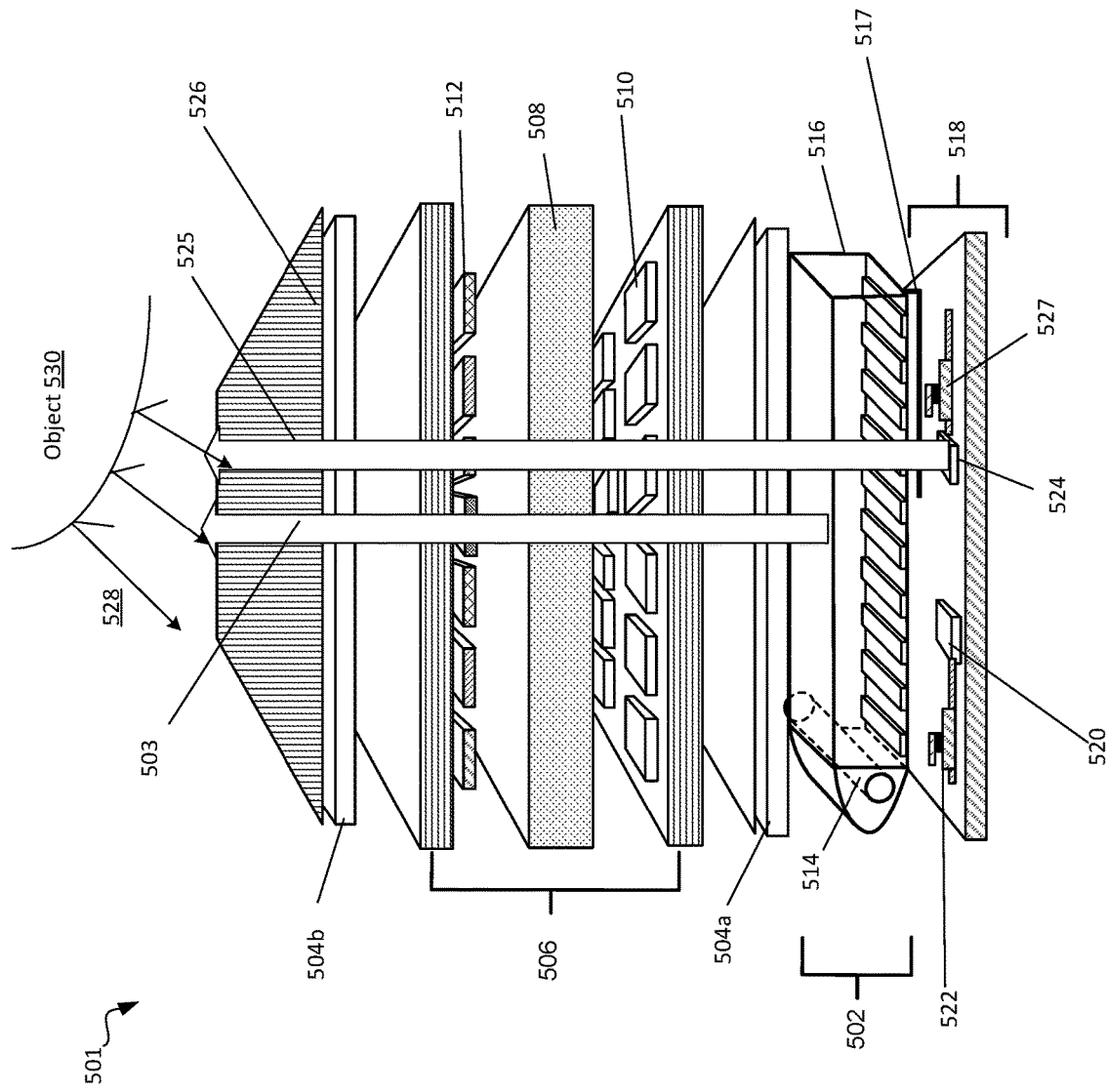

In some implementations, as depicted in FIG. 5B, the detector module 518 is located below the backlight module 502, where the NIR light 525 from the NIR light source 524 is directed substantially normal to a surface 526 of the display apparatus 500.

A location of the detector module 518 and a location of the NIR light source 524 can be selected in part based on transmission properties of the composite layers of the display apparatus 500 to near-infrared wavelengths. Additionally, a particular range of wavelengths of NIR light can be selected based in part on an attenuation factor of the range of wavelengths through the display apparatus. For example, 1.55 microns wavelength can have a 25% attenuation factor from origination at the NIR light source 524 until it reaches the top surface 526 of the display apparatus. In another example, a range of wavelengths 750 nm-1.1 microns may have an attenuation factor of 45% from an origination point at the NIR light source 524 until it reaches the top surface 526 of the display apparatus. In some implementations, longer wavelengths can have smaller attenuation factors than shorter wavelengths in the materials utilized for the display apparatus 500.

In some implementations, the detector module 518 can be separately fabricated and bonded in a post-processing step to the rest of the display apparatus 500.

In some implementations, as described above with reference to FIGS. 3 and 4, a detector 520 can be a Ge or SiGe detector, or can be a single-output or dual-output photodetector configured to perform time-of-flight measurements.

Example Process for the Display Apparatus

In general, the NIR light source is located below a display device, e.g., display device 102 in FIG. 1A, such that the NIR light emitted by the NIR light source is first deflected/scattered by one or more layers and/or features of the display device that are located between the NIR light source and the object of interest. The non-deflected/scattered NIR light then reflects off of the object and the reflected NIR light that is incident on the detector device of the display apparatus can be measured by one or more detectors (e.g., detectors 122 in FIG. 1A) that are part of the detector device (e.g., detector device 104) of the display apparatus. Thus, a calibration process can be performed to remove a pattern that is generated by the NIR light passing through the one or more layers of the display device prior to encountering the object of interest. Software image reconstruction can be used to remove the background noise and/or resulting patterns and generate a calibrated image of the object.

Figure 6:
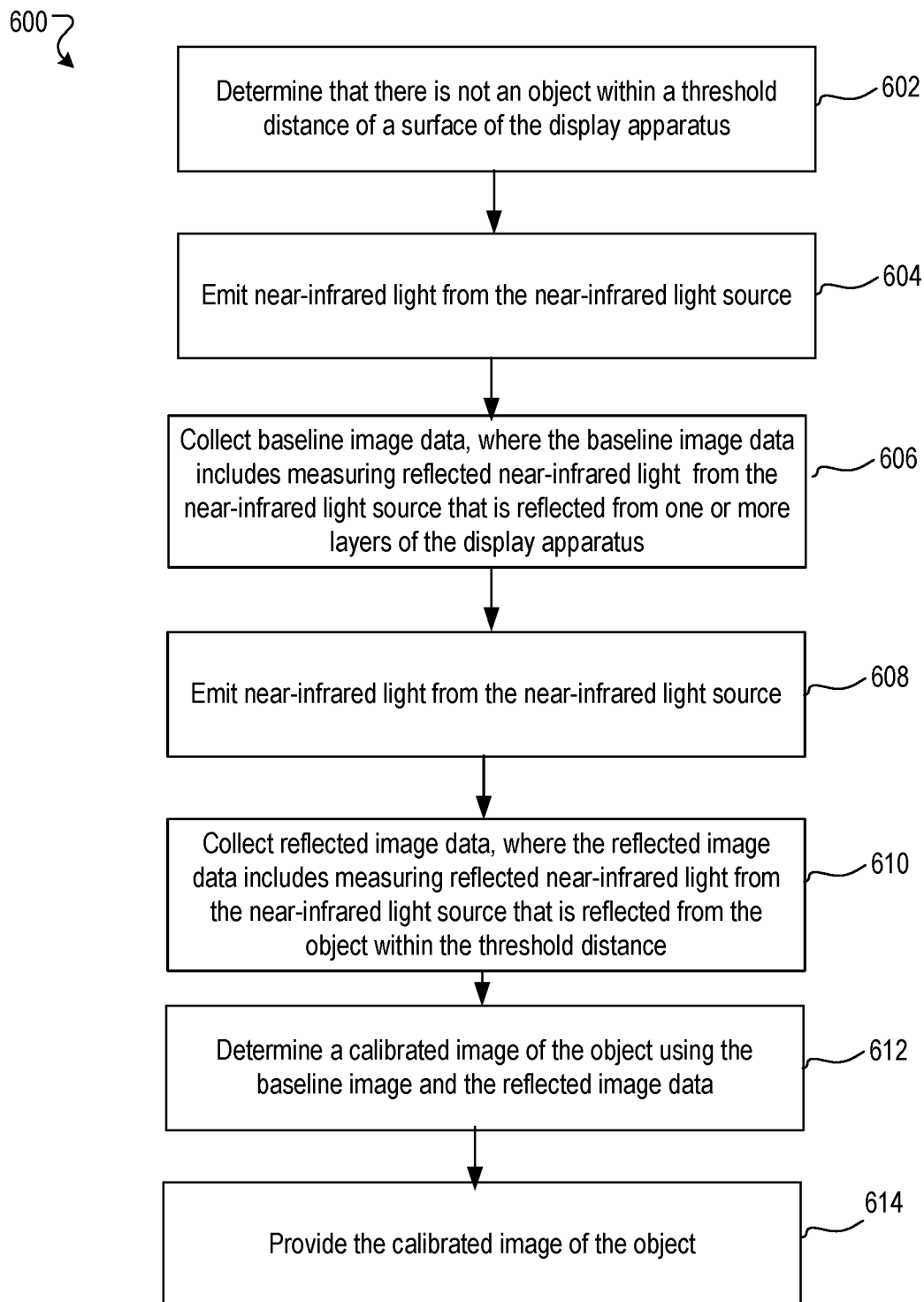
FIG. 6 is an example process for a display apparatus for emitting light and detecting the proximity of objects.

FIG. 6 is an example process 600 for a display apparatus (e.g., display apparatus 100 in FIG. 1A) to detect the proximity of objects (e.g., a finger, a hand, or a face) to a surface of the display apparatus.

A calibration or "dark" image can be measured by first determining that there are no object(s) within a threshold distance (e.g., a few millimeters, tens of centimeters, a few hundred centimeters) of a surface of the display apparatus (602). In order to take a calibration image, objects of interest (e.g., object 121) should not be within a threshold distance (e.g., distance 132 in FIG. 1A) of a surface of the display device (e.g., the front surface 123 of display device 102 in FIG. 1A). In some implementations, a threshold distance can be a few millimeters for a finger, tens of centimeters for a hand, tens to a few hundred centimeters for a face. Objects that are outside a threshold distance can be objects that are too far from the surface of the display device for a minimum electrical signal that is measured at the detector from reflected NIR light that reaches the detector (e.g., detector 122) of the display apparatus. A minimum electrical signal can depend, in part, on a sensitivity of the particular detector. For example, a minimum electrical signal can be, for example, at least >1 µV of electrical signal. At a distance greater than the threshold distance, the object can be disregarded.

In some implementations, the calibration image data can be collected during a set up process for the display apparatus, e.g., in a factory setting or when a user initializes the display apparatus. A calibration image can be measured, for example, in a dark room or an environment isolated from stray NIR light.

Near-infrared light is emitted from the near-infrared light source (604). NIR light (e.g., NIR light 124, NIR light 164, etc.) is emitted from the near-infrared light source. NIR light source can be, for example, an NIR OLED, an NIR MicroLED, an NIR laser diode, or another source of NIR light. The display apparatus can include an array of multiple NIR light sources, each emitting a NIR light and where each NIR light source is electrical connected to a control device, e.g., a display control circuit 116 or a laser control device 168. The emitted NIR light can range, for example, between 750 nm-1.65 microns. In another example, the emitted light can be 1.55 microns. The NIR light source can emit NIR light having a power ranging between 1 mW to a few Watts.

NIR light can be reflected (e.g., refracted or deflected) off of one or more intermittent layers between the emitting NIR light source and a front surface 123 of the display device 102. In some implementations, for example in the display apparatus 100 of FIG. 1A, the NIR light is reflected off of the transparent conductive oxide layer (e.g., first electrode area), and a transparent layer 106. In some implementations, for example in the display apparatus 170 of FIG. 1D, the NIR light is reflected off of one or more of the layers of the display device 102, e.g., the display integrated control layer, first electrode area, shielding layer, or the second electrode area).

Baseline image data is collected, where the baseline image data includes measured reflected NIR light from the NIR light source that is reflected, e.g., scattered, deflected, etc., from the one or more layers of the display apparatus (606). Baseline image data is collected at each detector of the multiple detectors of the display apparatus. Image data can be electrical signal generated from optical signal, where the optical signal is the reflected NIR light absorbed by each detector.

In some implementations, image data can be time-of-flight measurements made at each detector or photodetector of the multiple detectors/photodetectors of the display apparatus, where the time-of-flight measurement corresponds to phase, time, frequency, etc., delay of the optical signal (e.g., the emitted NIR light from the NIR light source) to reach a particular detector via a reflection (e.g., reflection off of a layer of the display device).

Each detector of the multiple detectors has a known position relative to each other detector, e.g., in an array of detectors across a surface of the display apparatus. The baseline image data can include a respective measurement (e.g., electrical signal, time-of-flight measurement, etc.) from each detector and metadata including a location of the particular detector relative to the array of detectors.

Once baseline image data has been collected, operation of the display apparatus can proceed. Near-infrared light is emitted from the near-infrared light source (608).

Reflected image data is collected, where the reflected image data includes measured reflected NIR light from the NIR light source that is reflected from the object within the threshold distance (610). As discussed above with reference to step 704, NIR light (e.g., NIR light 124, NIR light 164, etc.) is emitted from the near-infrared light source. The emitted NIR light can imping on an object that is within a threshold distance of a top surface (e.g., the front surface 123) of the display apparatus and reflect off of the object. The reflected NIR light (e.g., reflected NIR light 125) can be incident on the display apparatus such that at least a portion of the reflected NIR light is incident on one or more of the detectors in the detector device and is absorbed by the one or more detectors.

Reflected image data is collected at each detector of the multiple detectors of the display apparatus. Reflected image data can be electrical signal generated from optical signal, where the optical signal is the reflected NIR light absorbed by each detector.

In some implementations, reflected image data can be time-of-flight measurements made at each detector or photodetector of the multiple detectors/photodetectors of the display apparatus, where the time-of-flight measurement corresponds to phase, time, frequency, etc., delay of the optical signal (e.g., the emitted NIR light from the NIR light source) to reach a particular detector via a reflection (e.g., reflection off of the object that is within a threshold distance of the display device).

Each detector of the multiple detectors has a known position relative to each other detector, e.g., in an array of detectors across a surface of the display apparatus. The reflected image data can include a respective measurement (e.g., electrical signal, time-of-flight measurement, etc.) from each detector and metadata including a location of the particular detector relative to the array of detectors.

A calibrated image is determined of the object using the baseline image data and the reflected image data (612). In some implementations, a calibrated image can be generated based in part on a subtraction of the baseline image data from the reflected image data for each of the detectors across the multiple detectors. Image processing techniques can be implemented to construct an image of the object within the threshold distance of the display apparatus from the individual measurements at each of the multiple detectors in the array of detectors.

The calibrated image is provided of the object (614). In some implementations, the calibrated image of the object is provided as feedback to an application running on the display apparatus (e.g., a graphical user interface for a mobile device). In some implementations, the calibrated image is provided to motion, facial, gesture, and environmental tracking software, e.g., on a user tablet, mobile phone, television screen, or LCD panel.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A display apparatus comprising: a display surface; a polarizer layer arranged under the display surface; a detector module arranged under the polarizer layer and configured to emit first light toward the display surface and receive second light from the display surface, the detector module comprising: a substrate; a detector placed on the substrate; a detector control circuit placed on the substrate and electrically connected to the detector to control the detector; a first light source placed on the substrate; and a control circuit placed on the substrate and electrically connected to the first light source to control the first light source; and a second light source separating from the substrate and configured to emit visible light toward the display surface for displaying, wherein the first light source in the detector module is configured to emit near infrared (NIR) light to an object and the detector in the detector module is configured to receive reflected light from the object.

2. The display apparatus of claim 1, wherein the second light source is arranged under the detector module.

3. The display apparatus of claim 1, wherein the second light source is arranged above the detector module.

4. The display apparatus of claim 1, wherein the first light source is configured to emit non-visible light.

5. The display apparatus of claim 1, further comprising a filter layer arranged between the display surface and the detector module.

6. The display apparatus of claim 1, wherein the visible light from the second light source is capable of passing through the substrate to reach the display surface.

7. The display apparatus of claim 1, further comprising a backlight module, wherein light from the first light source is capable of passing through the backlight module to reach the display surface.

8. The display apparatus of claim 1, wherein the first light source comprises at least one of a packaged laser diode, a vertically cavity surface emitting laser (VCSEL), an edge emission laser (EEL), an organic light emitting diode (OLED), or a micro light emitting diode (LED), and wherein the first light source is configured to emit an optical signal having a wavelength in a range from 800 nm to 1650 nm.

9. The display apparatus of claim 1, wherein the detector further comprises a detection region supported by a first substrate.

10. The display apparatus of claim 9, wherein the first substrate comprises a first material, and the detection region comprises a second material different from the first material.

11. The display apparatus of claim 10, wherein the first material comprises silicon, and wherein the second material comprises germanium.

12. A display apparatus comprising:
a surface;
a detector module arranged under the surface, the detector module comprising:

a light source configured to emit first light toward the surface; and
a detector configured to receive second light from the surface;
a first polarizer covering the light source, wherein the first polarizer is configured to change a polarization state of the first light emitted from the light source and transmit the first light with the changed polarization state to reach the surface; and
a second polarizer covering the detector, wherein the second polarizer is configured to change a polarization state of the second light from the surface and transmit the second light with the changed polarization state to reach the detector,
wherein the light source is configured to emit near infrared (NIR) light to an object, and the detector is configured to receive reflected light from the object.

13. The display apparatus of claim 12, further comprising an additional visible light source configured to emit visible light toward the surface for displaying.

14. The display apparatus of claim 12, wherein the light source is configured to emit non-visible light.

15. The display apparatus of claim 12, wherein the detector module further comprises: a detector control circuit electrically connected to the detector and configured to control the detector; and a control circuit electrically connected to the light source and configured to control the light source.

16. The display apparatus of claim 15, wherein the detector, the detector control circuit, the light source, and the control circuit are assembled on a substrate.

17. The display apparatus of claim 1, wherein the polarizer layer comprises at least one of: a first polarizer configured to change a polarization state of the first light emitted from the first light source and transmit the first light with the changed polarization state to reach the display surface, or a second polarizer configured to change a polarization state of the second light from the display surface and transmit the second light with the changed polarization state to reach the detector.

18. The display apparatus of claim 1, further comprising a glass substrate module that comprises at least one of a liquid crystal layer, a circuit layer, or a color filter layer, wherein the glass substrate module is arranged above the detector module, wherein the polarizer layer is a first polarizer layer arranged between the glass substrate module and the detector module, and wherein the display apparatus further comprises a second polarizer layer arranged between the display surface and the glass substrate module.

\* \* \* \* \*